US007551778B2

(12) United States Patent
Miyatake et al.

(10) Patent No.: US 7,551,778 B2
(45) Date of Patent: Jun. 23, 2009

(54) BUSINESS FORM PROCESSING PROGRAM, METHOD, AND DEVICE

(75) Inventors: Jun Miyatake, Kawasaki (JP); Yasuhiro Ura, Kawasaki (JP)

(73) Assignee: PFU Limited, Kahoku (JP)

( * ) Notice: Subject to any disclaimer, the term of this patent is extended or adjusted under 35 U.S.C. 154(b) by 0 days.

(21) Appl. No.: 11/255,935

(22) Filed: Oct. 24, 2005

(65) Prior Publication Data

US 2006/0039606 A1 Feb. 23, 2006

Related U.S. Application Data

(63) Continuation of application No. PCT/JP03/06828, filed on May 30, 2003.

(51) Int. Cl.
*G06K 9/34* (2006.01)
*G06K 9/00* (2006.01)
*G06K 9/60* (2006.01)
*G06F 17/00* (2006.01)
*G06F 3/00* (2006.01)

(52) U.S. Cl. ....................... 382/180; 382/306; 382/163; 715/248; 707/7

(58) Field of Classification Search ................. 382/181, 382/180, 163, 306; 707/7; 715/248
See application file for complete search history.

(56) References Cited

U.S. PATENT DOCUMENTS 5,140,650 A * 8/1992 Casey et al. ................. 382/283
5,159,667 A * 10/1992 Borrey et al. ............... 715/500
5,509,092 A * 4/1996 Hirayama et al. ........... 382/301
5,694,494 A * 12/1997 Hart et al. ................... 382/305
5,721,940 A * 2/1998 Luther et al. ................ 715/506
5,857,034 A * 1/1999 Tsuchiya et al. ............ 382/175
6,396,950 B1 * 5/2002 Arai et al. .................... 382/181
6,950,553 B1 * 9/2005 Deere ......................... 382/218
2001/0021270 A1 * 9/2001 Kobara et al. ............... 382/181
2002/0044686 A1 * 4/2002 Yamazaki ................... 382/167
2002/0136447 A1 * 9/2002 Link et al. .................. 382/163

FOREIGN PATENT DOCUMENTS

JP 63-217489 9/1988
JP 63-308689 12/1988
JP 2-268385 11/1990
JP 6-68299 3/1994
JP 6-243290 9/1994
JP 2001-256433 9/2001

OTHER PUBLICATIONS

Translation of Unexamined Japanese Patent Application JP-A-7-256972 (Ikeuchi), provided herein.*
Japanese Office Action dated Aug. 19, 2008 issues in corresponding Japanese Patent Application No. 2005-500223.

* cited by examiner

*Primary Examiner*—Jingge Wu
*Assistant Examiner*—Kathleen S Yuan
(74) *Attorney, Agent, or Firm*—Staas & Halsey LLP

(57) ABSTRACT

A business form processing program to cause a computer to execute a character box-image reading step for reading by a scanner all colors of a business form with blank character boxes and storing them as character box images, a business form reading step for reading by a scanner a recognized image from which colors of unwanted recognized parts on a filled-out business form are dropped out and storing it, a character recognizing step for recognizing characters on the recognized image, and a composite display step for displaying the character recognized results and a filled-out business form image in which the recognized image is superposed on the character box image when character recognized results need correted.

11 Claims, 24 Drawing Sheets

44 NAME OF BUSINESS FORM (CLASSIFICATION ID)

48

JOB CLASSIFICATION ☐☐☐ - ☐☐   INDUSTRY CLASSIFICATION ☐☐☐

DISCLOSURE CLASSIFICATION ☐   THE NUMBER OF PAGES DISCLOSED ☐   NONDISCLOSURE ☐

THE NUMBER OF PAGES OF JOB OFFER LISTS ☐   NOMINATION ☐   PLACE ☐

LICENSE 1 ☐   2 ☐   3 ☐

NAME OF BUSINESS FORM (CLASSIFICATION ID)

JOB CLASSIFICATION [7][2][1]-[3][4]　　INDUSTRY CLASSIFICATION [ ][ ]

DISCLOSURE CLASSIFICATION [ ]　THE NUMBER OF PAGES DISCLOSED [1]　NONDISCLOSURE [3]

THE NUMBER OF PAGES OF JOB OFFER LISTS [8]　NOMINATION [ ]　PLACE [ ]

LICENSE 1 [1][1]　2 [2][2]　3 [3][3]

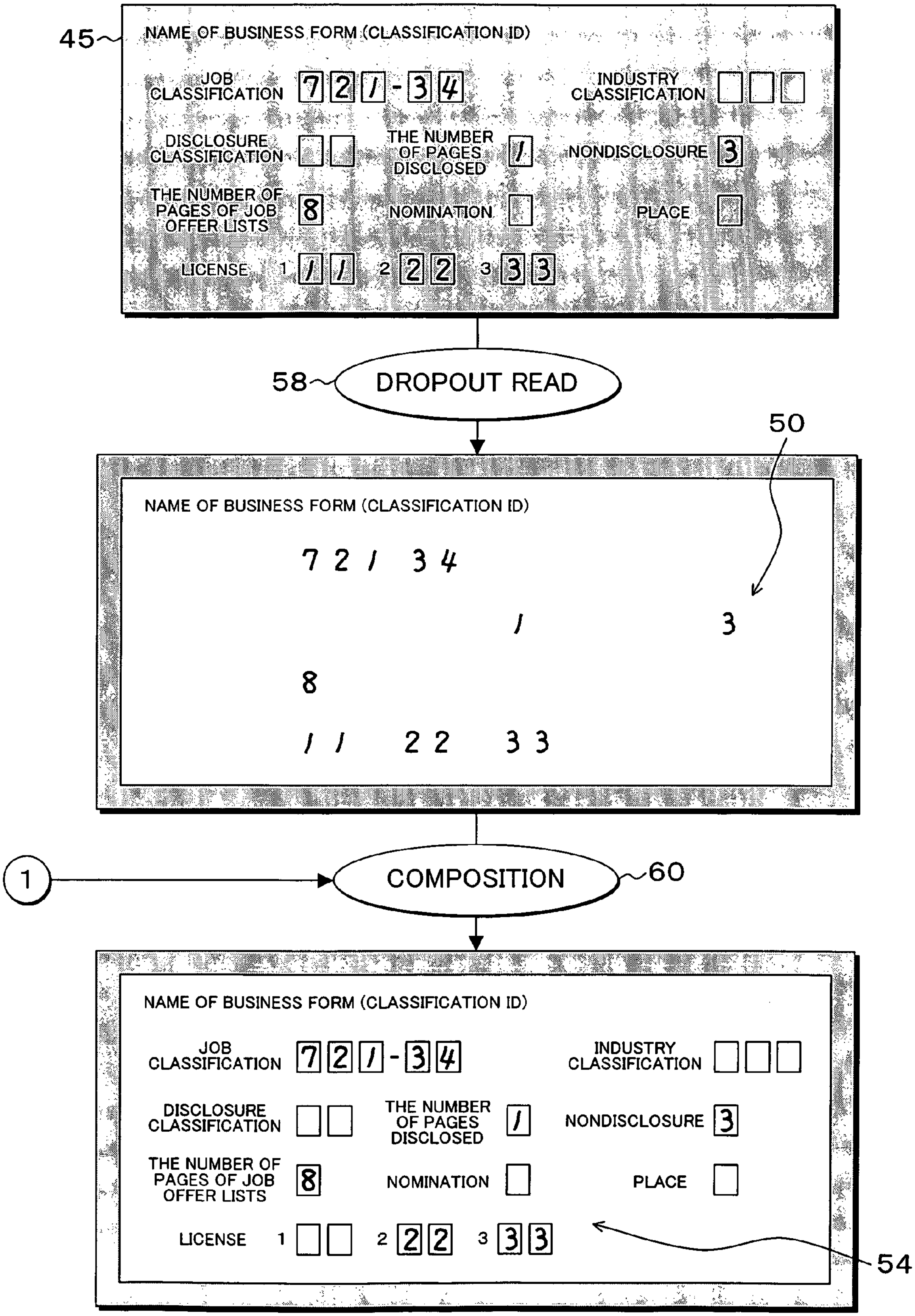

45 — NAME OF BUSINESS FORM (CLASSIFICATION ID)

JOB CLASSIFICATION [7][2][/]-[3][4]   INDUSTRY CLASSIFICATION ☐☐

DISCLOSURE CLASSIFICATION ☐☐   THE NUMBER OF PAGES DISCLOSED [/]   NONDISCLOSURE [3]

THE NUMBER OF PAGES OF JOB OFFER LISTS [8]   NOMINATION ☐   PLACE ☒

LICENSE  1 [/][/]  2 [2][2]  3 [3][3]

↓ 58 — DROPOUT READ

50

NAME OF BUSINESS FORM (CLASSIFICATION ID)

7 2 / 3 4

/                3

8

/ /    2 2    3 3

① → COMPOSITION — 60

↓

NAME OF BUSINESS FORM (CLASSIFICATION ID)

JOB CLASSIFICATION [7][2][/]-[3][4]   INDUSTRY CLASSIFICATION ☐☐

DISCLOSURE CLASSIFICATION ☐☐   THE NUMBER OF PAGES DISCLOSED [/]   NONDISCLOSURE [3]

THE NUMBER OF PAGES OF JOB OFFER LISTS [8]   NOMINATION ☐   PLACE ☐

LICENSE  1 ☐☐  2 [2][2]  3 [3][3]

| CLASSIFICATION ID | FORMAT DEFINITION INFORMATION | | | |
|---|---|---|---|---|
| | FIELD ID | FIELD COORDINATE | FIELD CENTER COORDINATE | OTHERS |
| 001 | 001 | P11, P12, P13, P14 | P10 | |
| | 002 | P21, P22, P23, P24 | P20 | |
| | 003 | P31, P32, P33, P34 | P30 | |
| | 004 | P41, P42, P43, P44 | P40 | |
| 002 | 001 | P11, P12, P13, P14 | P10 | |
| | 002 | P21, P22, P23, P24 | P20 | |
| | 003 | P31, P32, P33, P34 | P30 | |
| | | | | |

| CLASSIFICATION ID | CHARACTER-BOX IMAGE DATA |
| --- | --- |
| 001 | □□□□□□□□□□□□□□□□□□□□□□ ・・・・・・・・・・ □ |
| 002 | □□□□□□□□□□□□□□□□□□□□□□ ・・・・・・・・・・ □ |
| 003 | □□□□□□□□□□□□□□□□□□□□□□ ・・・・・・・・・・ □ |
| 004 | □□□□□□□□□□□□□□□□□□□□□□ ・・・・・・・・・・ □ |
| 005 | □□□□□□□□□□□□□□□□□□□□□□ ・・・・・・・・・・ □ |
| | |

| BUSINESS FORM ID | CLASSIFICATION ID | RECOGNIZED IMAGE DATA |
|---|---|---|
| 001 | 011 | □□□□□□□□□□□□□□□□□□□□□□ · · · □ |
| 002 | 002 | □□□□□□□□□□□□□□□□□□□□□□ · · · · · · □ |
| 003 | 015 | □□□□□□□□□□□□□□□□□□□□□□ · · □ |
| 004 | 012 | □□□□□□□□□□□□□□□□□□□□□□ · · · · · □ |
| 005 | 021 | □□□□□□□□□□□□□□□□□□□□□□ · · · · · · · □ |
| | | |

84

| CODE NUMBER | COLOR DATA |
|---|---|
| | |
| | |
| 211 | A |
| 212 | A' |
| | |

86

| CODE NUMBER | COLOR DATA |
|---|---|
| | |
| | |
| 211 | A |
| 212 | BLACK |
| | |

BUSINESS FORM PROCESSING PROGRAM, METHOD, AND DEVICE

This application is a continuation of PCT/JP03/06828, filed May 30, 2003.

TECHNICAL FIELD

The present invention relates to a program, method, and device for processing business forms whereby to read optically and recognize handwritten characters thereon and, in particular, to a program, method, and device for processing business forms whereby to process a read image from which colors of unnecessary recognized parts on a filled-out business form are dropped out.

BACKGROUND ART

In a process for reading a business form whose character boxes are filled out with necessary matters using a scanner (optical character reader) and for recognizing characters on the read image, a recognized image consisting of only written characters to be recognized is obtained with colors excluding those of written characters on the business form dropped out when business forms are read with a scanner, for the purpose of increasing accuracy in character recognition of read image.

More specifically, business forms are prepared whose character boxes and necessary matters are printed in a dropout color excluding that of written characters using black and the characters on the business forms are recognized in the following steps. (Step 1) A filled-out business form to be recognized is read in a black background by a scanner. At this point the color of a light source is matched to the dropout color of the business form to dropout parts unnecessary for recognition such as fields. (Step 2) A recognized area is defined by finding edges of the business form in the character box image and the black background of recognized business form to recognize characters within the area.

However, in checking a recognized image obtained by dropping out the fields on the business form and a image of recognized results while both images are arranged side by side on a screen, it has been hard to identify which written contents correspond to which items because the recognized image has only written characters, which has made difficult to check contents and correct recognized results if errors are found.

FIG. 25 is a working screen showing a conventional method of processing a business form. On the left hand of the screen is displayed a recognized image 200 in which only written characters are read with fields dropped out. On the right is displayed a recognized result 202 with a predetermined format prepared by recognizing the written characters on the recognized image 200. However, the recognized image 200 with only written characters from which fields are dropped out, making it difficult to identify which written contents correspond to which items of the recognized results 202. That also makes it difficult to correct recognized results if errors are found after check.

To solve this problem, the conventional method of reading business forms uses a scanner with a special OCR to import simultaneously a dropout and a non-dropout image in a single operation for reading business forms, whereby enabling displaying the non-dropout image and recognized results on a screen, resulting in easy check and correction of them.

(Patent Literature 1)

Japanese Unexamined Patent Application Publication No. Hei 6-68299

The conventional method of importing simultaneously the dropout and non-dropout images, however, causes a problem in that a scanner with a special OCR is required so that the cost is increased because a universal scanner cannot be used. If a universal scanner is used, business forms need reading twice while colors to be read are changed, taking trouble and time with reading operation by the scanner.

Furthermore, the dropout and non-dropout images need storing to check if recognized results are correct on a reproducing screen when questions arise while checking the recognized results. This leads to a problem that two-page image data needs storing per business form so that an image data storage capacity is substantially increased as a whole because business forms read as day-to-day process are enormous in number. The non-dropout image, in particular, appears in color due to color printing made at the dropout parts, so that it requires much more storage capacity than the monochrome dropout image.

DISCLOSURE OF INVENTION

The purpose of the present invention is to provide a program, method, and device for processing business forms that are adapted to reproduce easily an image of a filled-out business form from a dropout image of a business form by reading previously the dropout parts of the business form.

The present invention provides a business form processing program to be executed by a computer. This business form processing program is characterized by causing a computer to execute:

a character box-image reading step for reading all colors of a business form with blank character boxes and storing them as character box images;

a business form reading step for reading a recognized image from which colors of unwanted recognized parts on a filled-out business form are dropped out and storing it;

a character recognizing step for recognizing characters on the recognized image; and a composite display step for displaying the character recognized results and a filled-out business form image in which the recognized image is superposed on the character box image.

According to the business form processing program of the present invention, recognizing characters from a recognized image read by dropping out the filled-out business form allows an image of filled-out business form to be restored by superposing it on the character box image as dropout parts of the business form stored previously and permits characters on the recognized image to correspond to appropriate fields on the business form on the screen, which makes it simply and surely to check and correct recognized results. The character box image as non-dropout image of blank business form needs storage capacity required to store only image data for types of business forms, which can substantially reduce storage capacity for image data in comparison with the case where color image data for business forms are all stored as non-dropout image. With regards to a scanner used for reading business forms as an optical character reader, a universal color scanner capable of setting read colors may be used, which facilitates introduction and reduces cost, in addition being effective in work because it can read a filled-out business form in a single operation.

The composite display step comprises: a rotation angle detecting step for detecting a rotation angle $\theta$ to be used for superposing the recognized image on the character box image; a parallel displacement detecting step for detecting a parallel displacement (x, y) to be used for superposing both images on each other with either the recognized image or the character box image rotated by the rotation angle θ; and an image composing step for composing pixel values based on corresponding relations between pixels of the recognized and character box images obtained with respect to the rotation angle θ and parallel displacement (x, y), wherein the rotation angle detecting step and parallel displacement detecting step detect a rotation angle θ and parallel displacement (x, y) using the positional relationship between center coordinates in corresponding plural fields on the character box image and the recognized image. More specifically, the rotation angle detecting step and parallel displacement detecting step determine a median out of plural rotation angles and parallel displacements detected using the positional relationship between center coordinates in corresponding plural fields on the character box image and the recognized image. This enables correctly detecting disposition between the recognized and character box images, thereby composing images located correctly.

The character box-image reading step reads the character box image from various plural business forms, provides the character box image with a classification identifier recognized from the read image, and stores it; the business form reading step reads a recognized image from which colors of unwanted recognized parts on a filled-out business form are dropped out, provides the read image with the classification identifier recognized from the read image, and stores it; and the composite display step selects the character box image with an identifier corresponding to the identifier of the recognized image and superposes it thereon. As described above the business form processing program of the present invention is adapted to process plural types of business forms. Therefore, even though it reads continuously various types of handwritten filled-out business forms in mixed condition, it can restore an image of the filled-out business form by superposing them on the character box image corresponding to classification of types of business forms.

The composite display step displays the filled-out business form image in which the recognized image to be stored is superposed on the character box image when needed after the recognized results are corrected. In that way, contents can be checked with an image of the filled-out business form reproduced whenever there arises a problem with contents of the recognized results after the recognized results are processed by reading the business form.

The composite display step selects a pixel value of the recognized image when the pixel of the recognized image is superposed on that of the character box image. In that way, superposing written characters as a recognized image preferentially facilitates checking written contents to be recognized.

The composite display step conducts a composite display with the densities of the recognized and the character box image fixed at a predetermined density. Further the composite display step conducts a composite display with the densities of the recognized and the character box image changed. Still further, the composite display step conducts a composite display with the densities changed so that the ratio in density (contrast) between the recognized and character box images is equal to a predetermined value. Thus, the control and change of density and color of characters on the character box and recognized images can improve visibility of written characters. The composite display step displays a composite image of the recognized image and the character box image superposed thereunder and an image of the recognized results with both the images arranged side by side on a screen.

The present invention provides a method for processing business forms comprising: a character box-image reading step for reading all colors on the business forms with blank character boxes and storing as a character box image; a business form reading step for reading a recognized image from which colors of unwanted recognized parts on a filled-out business form are dropped out and storing it; a character recognizing step for recognizing characters on the recognized image; and a composite display step for displaying the character recognized results and a filled-out business form image produced by superposing the recognized image on the character box image.

The present invention provides a business form processing device comprising: a character box-image reading unit for reading all colors of a business form with blank character boxes and storing them as a character box image; a business form reading unit for reading a recognized image from which colors of unwanted recognized parts on a filled-out business form are dropped out and storing it; a character recognizing unit for recognizing characters on the recognized image; and a composite displaying unit for displaying the character recognized results and a filled-out business form image produced by superposing the recognized image on the character box image.

The details of the method and device for processing business forms according to the present invention are basically the same as those of the program therefof.

BRIEF DESCRIPTION OF DRAWINGS

FIGS. 8A and 8B are drawing describing a process for composing images using a character box image and a read image according to the present invention;

FIG. 9 is a table describing the format definition file shown in FIGS. 1A and 1B;

FIG. 10 is a table describing the character box-image file shown in FIGS. 1A and 1B;

FIG. 11 is a drawing describing the recognized image file shown in FIGS. 1 A and 1B;

BEST MODE FOR CARRYING OUT THE INVENTION

Figure 1A:
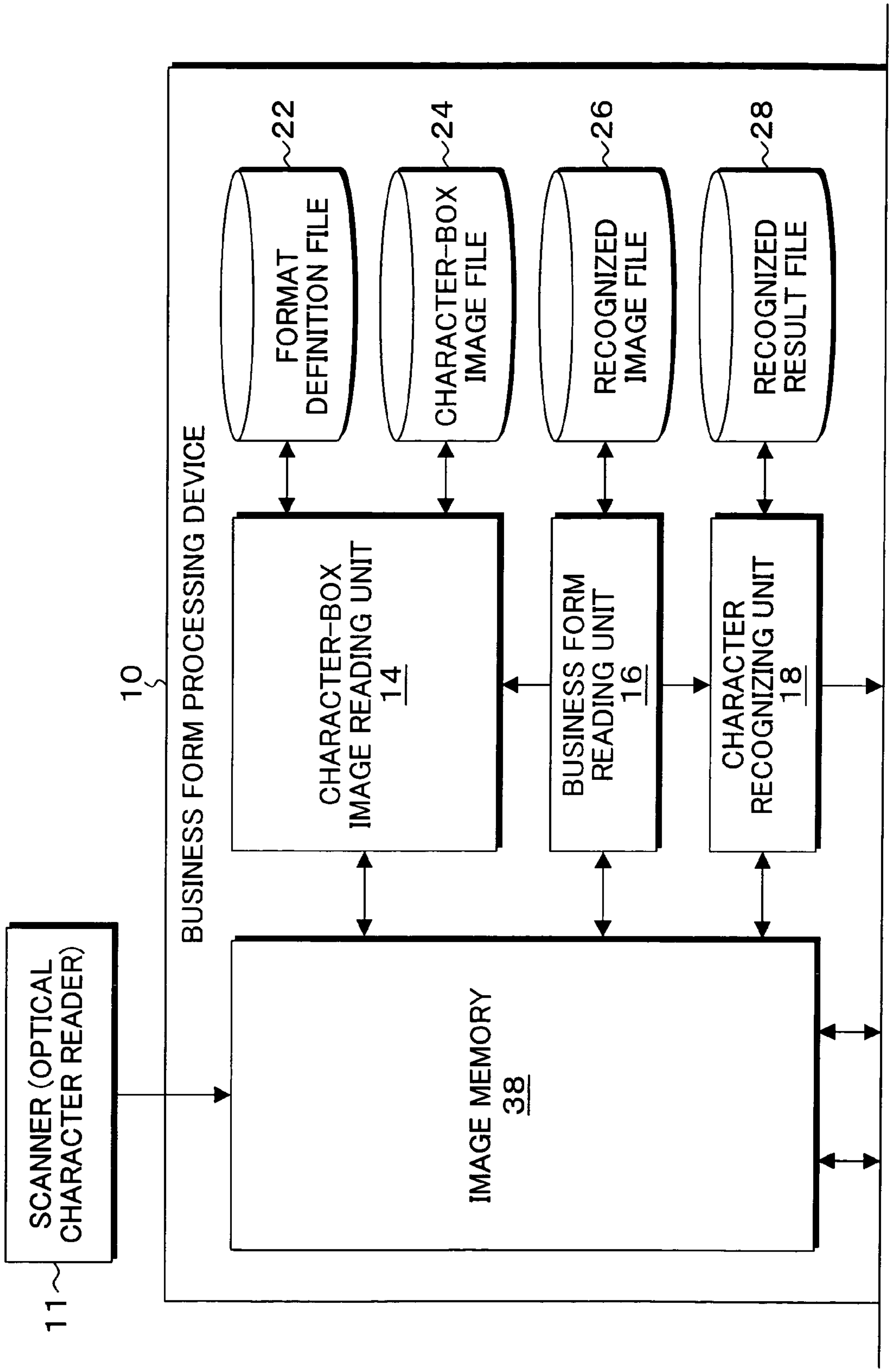
FIGS. 1A and 1B are block diagrams showing functions and configurations of an embodiment according to the present invention.
Figure 1B:
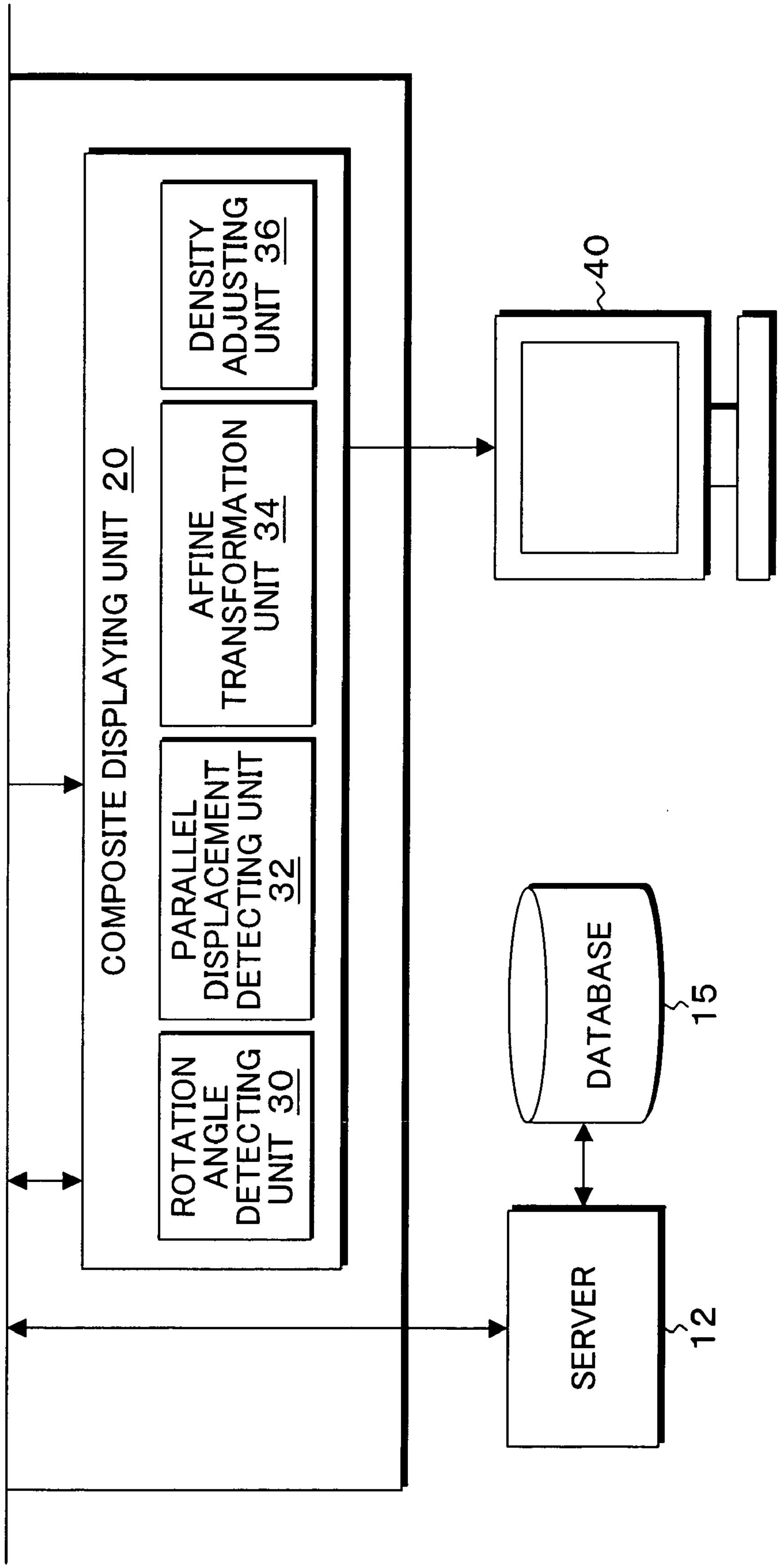

FIGS. 1A and 1B are block diagrams showing functions and configurations of an embodiment of a processing a business form according to the present invention. In FIGS. 1A and 1B business form processing device 10 of the present invention is realized by a personal computer, and connected to a scanner (optical character reader) 11 as a device for inputting business forms. It is also connected to a display unit 40 for displaying processed results. The business form processing device 10 as a client is connected with a server 12 via a network such as LAN, and the server 12 is adapted to store the processed results from the business form processing device 10 in a database 15. The business form processing device 10 is provided with a character box-image reading unit 14, business form reading unit 16, character recognizing unit 18, composite displaying unit 20, format definition file 22, character box-image file 24, recognized image file 26, recognized result file 28, and image memory 38 functioning as a work memory. The composite displaying unit 20 is provided with a rotation angle detecting unit 30, parallel displacement detecting unit 32, affine transformation unit 34, and density adjusting unit 36. The character box-image reading unit 14 reads all colors of dropout color business forms with a plurality of fields consisting of blank character boxes through the scanner 11 and stores them as a character box image in the character box-image file 24. In the present embodiment, is prepared a format definition information describing parts where characters on the business form are recognized in relation with results of a read character box image and stored in the format definition file 22. Normally plural types of blank dropout color business forms processed at the character box-image reading unit 14 are prepared, and on each business form is printed in advance a classification ID as an identifier indicating types of business forms. The format definition information stored in the character box-image file 24 and the format definition file 22 therefore is provided with the classification ID. The business form reading unit 16 reads recognized images from which the colors of unnecessary recognized parts, i.e., fields as character boxes, of a filled-out business form are dropped out and stores them in a recognized image file 26. When stored in the recognized image file 26, the recognized image is provided with a classification ID entered in the business form and a business form ID given each business form. The character recognizing unit 18 recognizes handwritten characters at the read area specified by the format definition information read from the format definition file 22 by the classification ID of the recognized image obtained by the business form reading unit 16, prepares document in accordance with predetermined format based upon the results of character recognition, and stores as the recognized results in the recognized result file 28. The composite display unit 20 reads corresponding character box images from the character box-image file 24 by the classification ID in correcting character recognition results produced by the character recognizing unit 18 and displays filled-out business form image in which the character box image is superposed on the recognized image along with the recognized image side by side on the display unit 40. The rotation angle detecting unit 30, parallel displacement detecting unit 32, affine transformation unit 34 are provided to detect and correct displacement between the two images caused by superposing the recognized and character box images in the composite display unit 20. The rotation angle detecting unit 30 detects a rotation angle (displaced rotation angle) θ to be used for superposing the recognized image on the character box image. The parallel displacement detecting unit 32 detects a parallel displacement (x, y) to be used for superposing the both on each other, for example, with the recognized image rotated by the detected rotation angle θ with respect to the character box image. The affine transformation unit 34 determines corresponding relationships for each pixel between the recognized and character box images on a basis of a rotation angle θ and a parallel displacement (x, y) in order to compose pixel values. Further the composite display unit 20 is provided with the density adjusting unit 36, which is adapted to adjust density of the character box and recognized images if required on the displayed and composite filled-out image to be adjusted.

Figure 2:
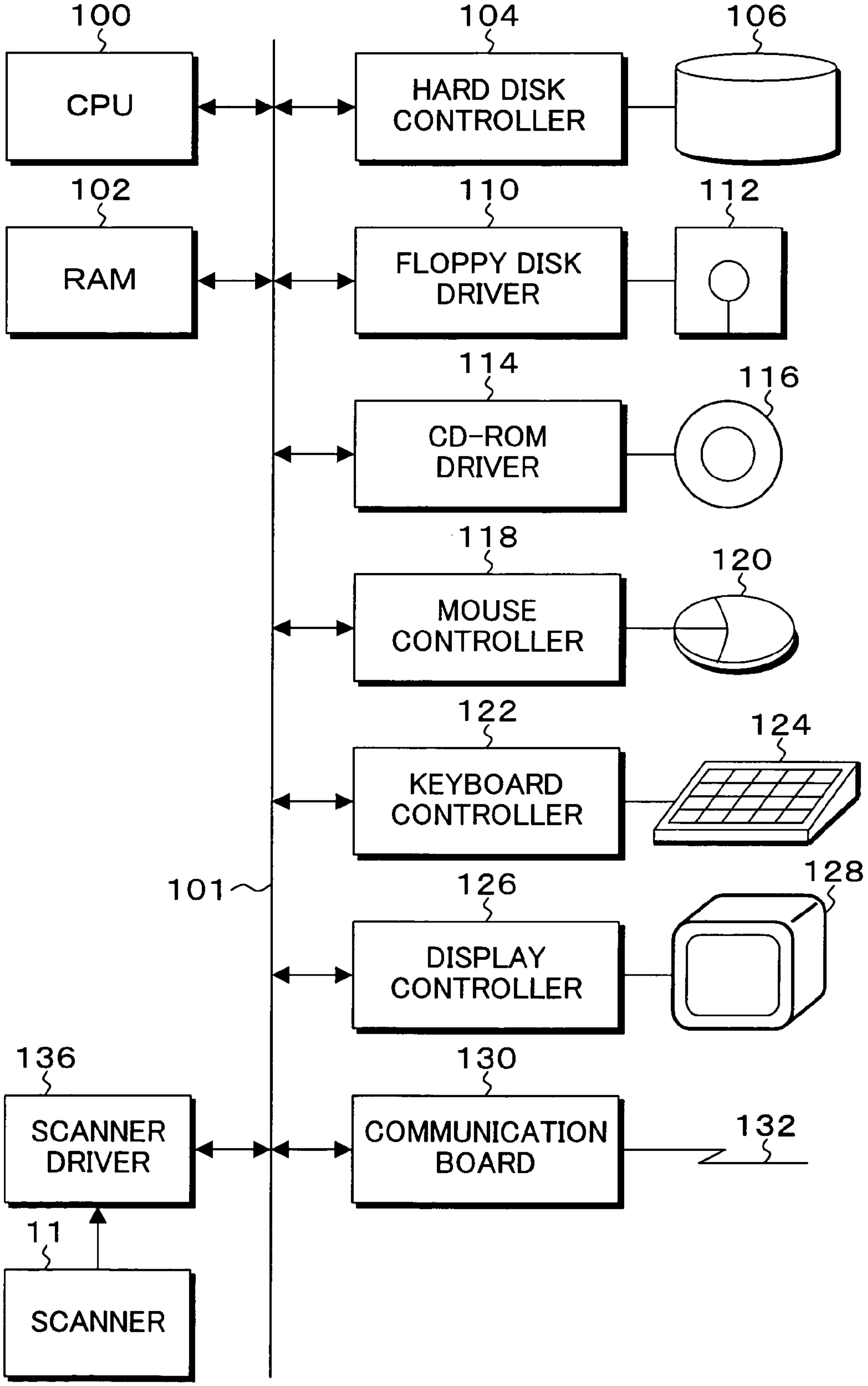
FIG. 2 is a drawing describing environment of computer hardware to which the present invention is applied.

The business form processing device 10 according to the present invention in FIGS. 1A and 1B are realized, for example, by computer hardware resource shown in FIG. 2. In FIG. 2, a bus 101 of CPU 100 is connected to a RAM 102, hard disk controller (software) 104, floppy disk driver (software) 110, CD-ROM driver (software) 114, mouse controller 118, keyboard controller 122, display controller 126, communication board 130, and scanner driver 136. The hard disk controller 104, which is connected to a hard disk drive 106 and loads a program for executing the business form process according to the present invention, calls required programs from the hard disk drive 106 in booting up a computer, deploys them over the RAM 102, and runs them by the CPU 100. The floppy disk driver 110 connected to a floppy disk drive (hardware) 112 can read from and write into a floppy disk (R). The CD-ROM driver 114 connected to a CD drive (hardware) 116 can read data and programs stored in CD. The mouse controller 118 transmits input operations of a mouse 120 to the CPU 100. The keyboard controller 122 transmits input operations of a keyboard 124 to the CPU 100. The display controller 126 displays on a displaying unit 128. The communication board 130 uses communication lines 132 such as LAN to be connected to a data base server which stores documents prepared by reading business forms, and communicates with an external devices through networks such as the Internet. The scanner driver 136 is adapted to drive a scanner 11 which is connected outside as software to be implemented by executing programs with the CPU 100, and capable of non-dropout reading adaptable to full colors and dropout reading for a specific dropout color.

Figure 3:
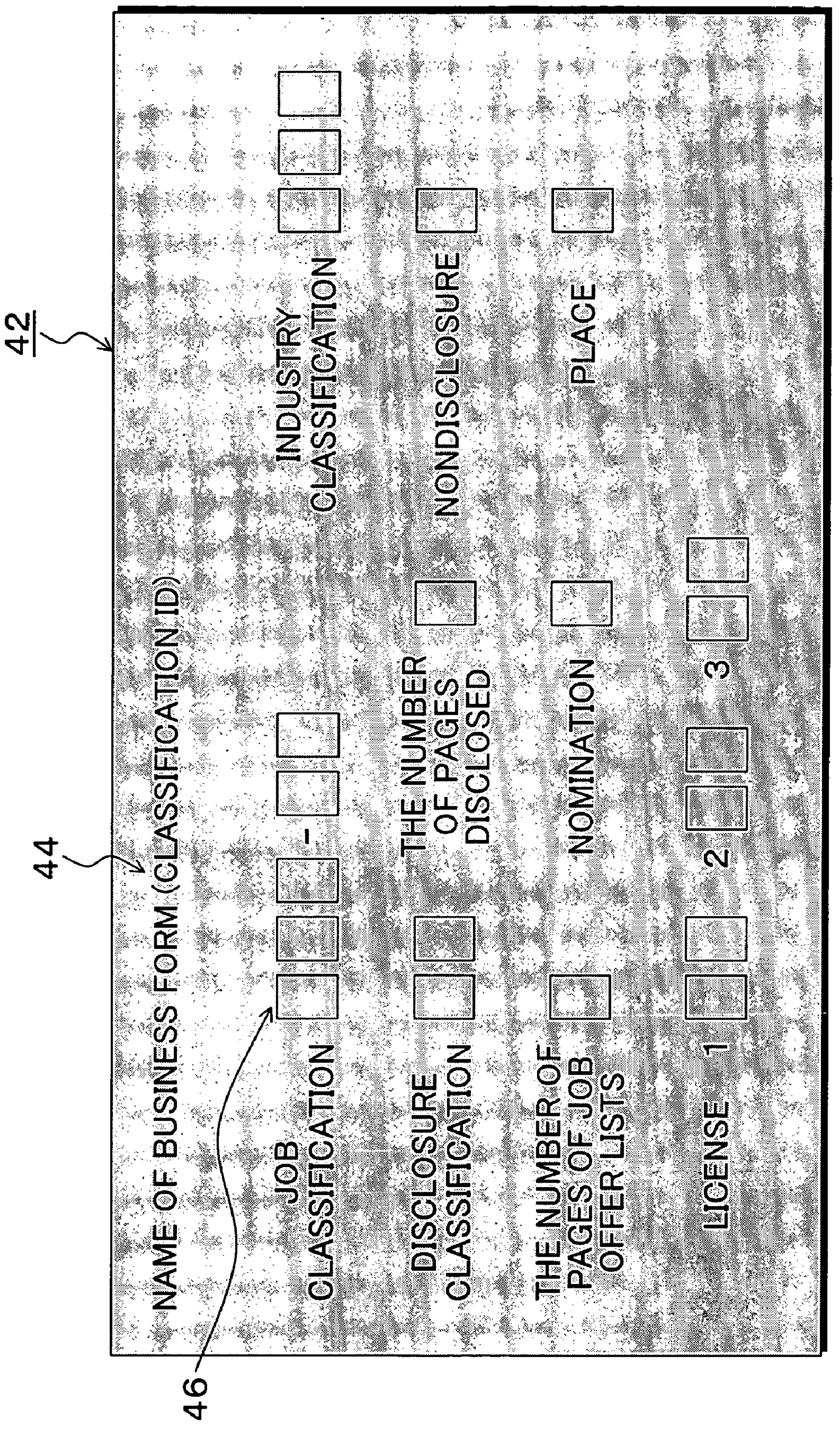
FIG. 3 is a drawing describing a business form using a dropout color form.

FIG. 3 is a drawing describing a blank business form using a dropout color form to be read according to the present invention. In FIG. 3 a business form 42 is printed with inputted grayscale or color image designated as a dropout color. The following embodiment takes an example where the character box and necessary items and characters are shown by using a prescribed dropout color, for example, blue, as illustrated in figures. A plurality of fields 46 used as character boxes are arranged on the business form 42. In this example, the business form 42 is produced so that one character can be written in one field 46. At the upper left corner of the business form 42, a business form name is indicated, and a classification ID 44 is printed next. A prescribed character string or bar code is used as this classification ID 44. The classification ID 44 is printed in color except the dropout color of the business form 42, for example, in "black" if the dropout color is "blue."

Figure 4:
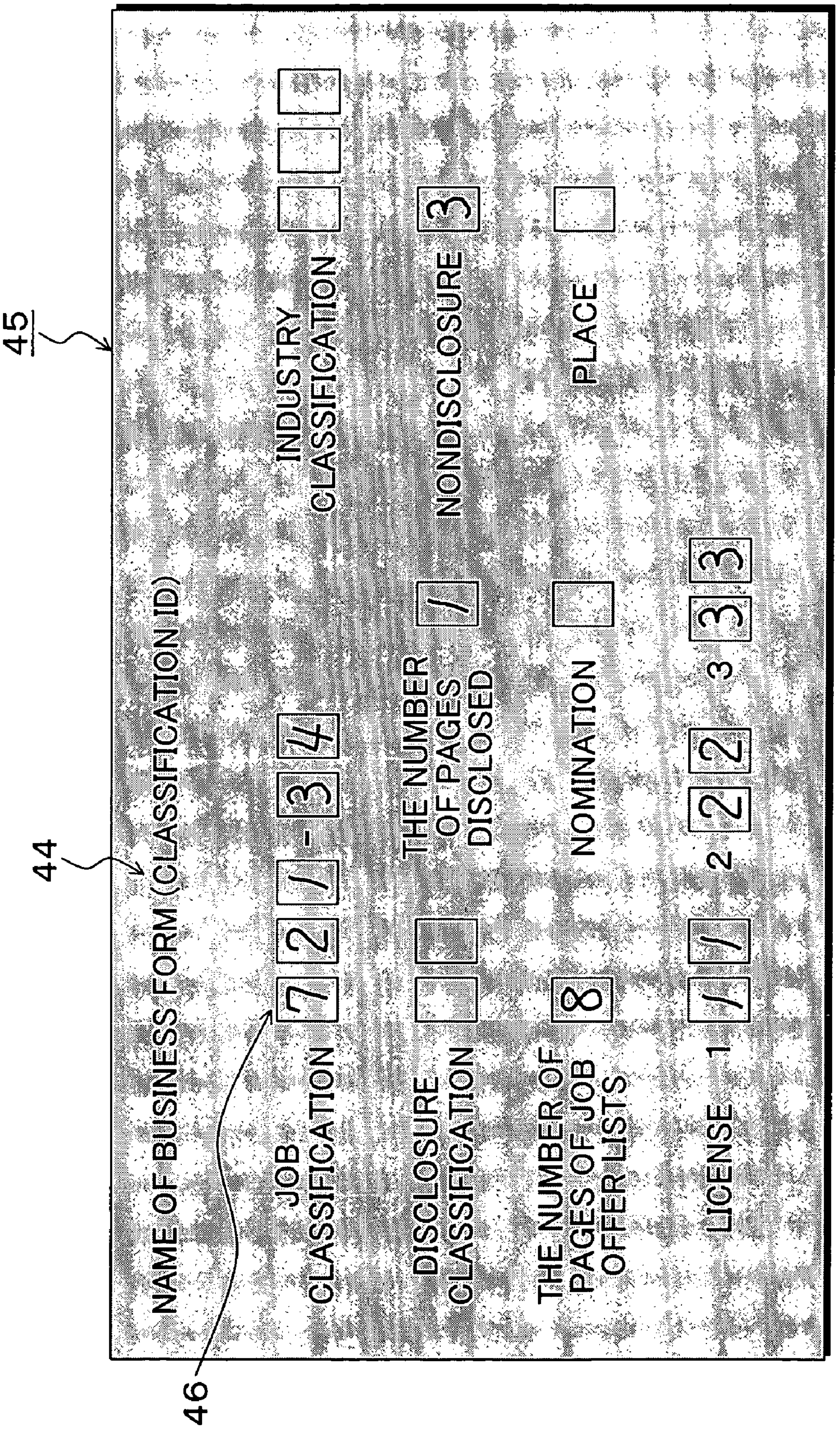
FIG. 4 is a drawing describing a filled-out business form to be read.

FIG. 4 a drawing describing a filled-out business form 45 to be read in the present invention. The fields 46 of the filled-out business form 45 are filled out if needed. The characters are written in "black" instead of "blue" that is the dropout color.

Figure 5:
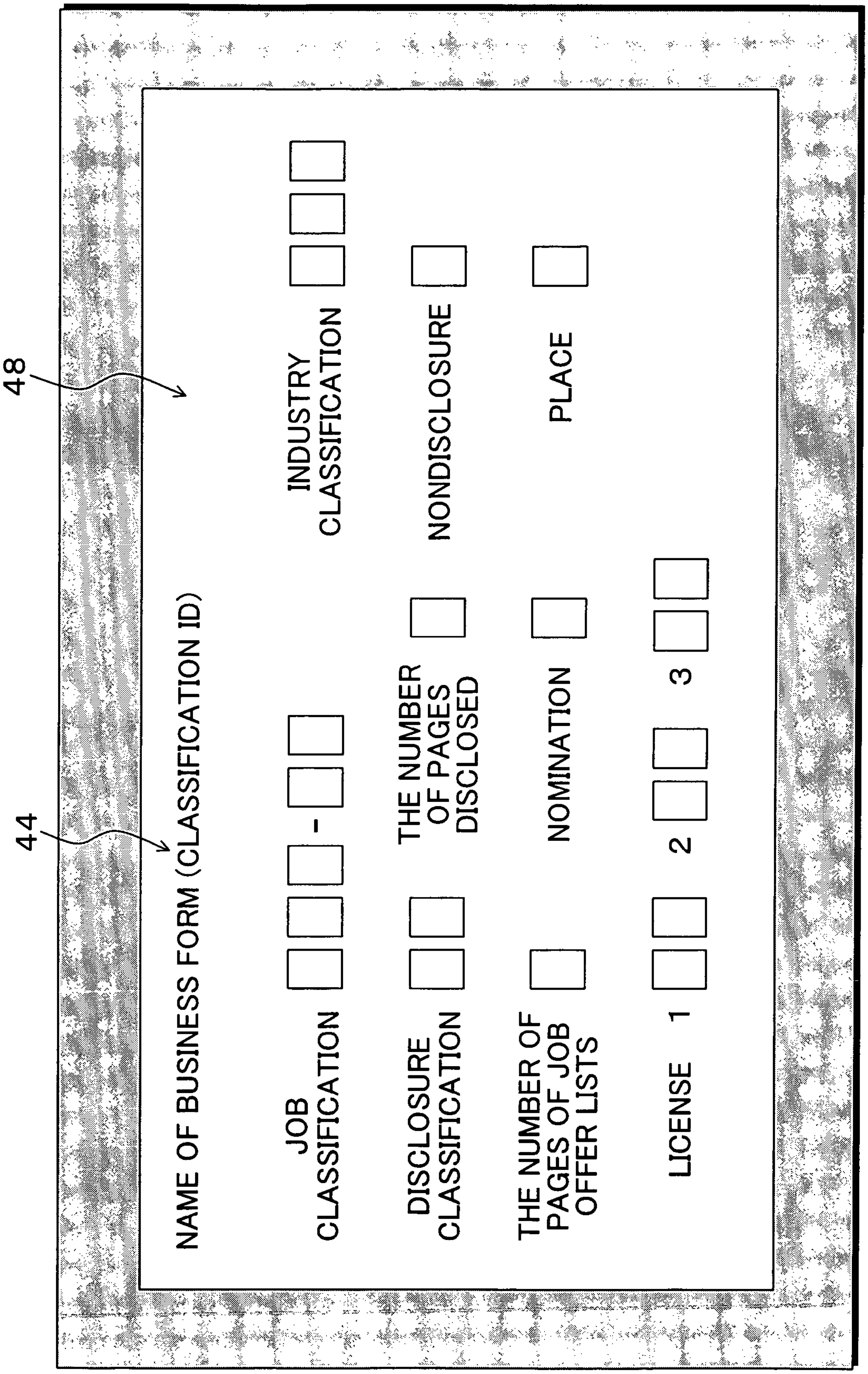
FIG. 5 is a drawing describing a character box image obtained by non-dropout read.

FIG. 5 is a drawing describing a character box image 48 obtained by the non-dropout read through the functions of the character box-image reading unit 14. The character box image 48 is read in such a manner that the scanner 11 is loaded with the blank business form 42 shown in FIG. 3 and scans all colors. The character box image 48 obtained by the non-dropout read has been read to be an image in a black background. Finding the edges of the business form in the black background on the character box image 48 can produce format definition information defining a range for recognizing characters. In other words, in the character box image 48 the coordinates of fields 46 on the image surface are produced as format definition information defining a range for recognizing characters, and stored in the format definition file 22 shown in FIGS. 1A and 1B with the classification ID attached to the information. At the same time the character box image 48 in itself is stored in the character box-image file 24 with the classification ID attached thereto.

Figure 6:
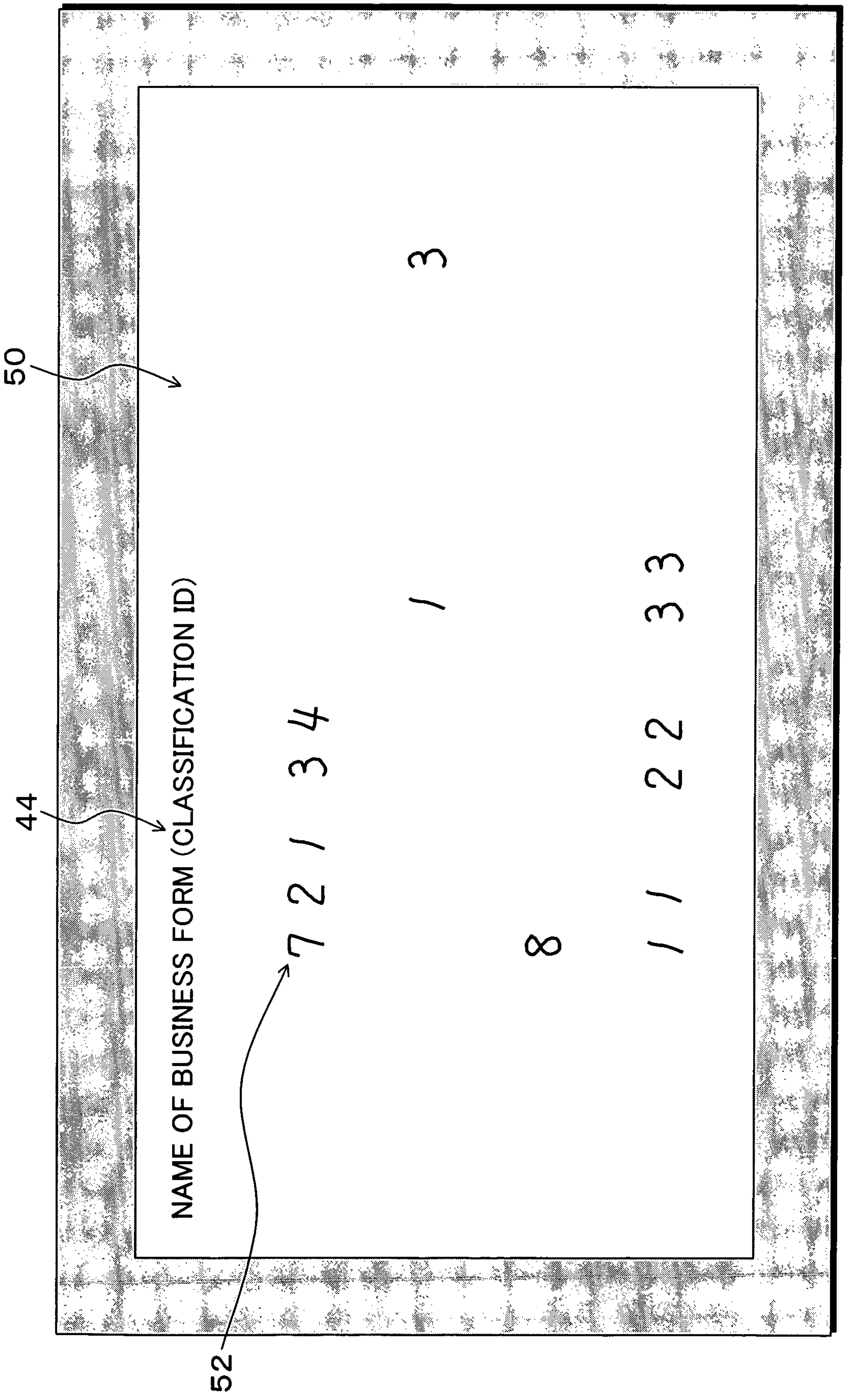
FIG. 6 is a drawing describing a recognized image obtained by dropout read.

FIG. 6 is a drawing describing a recognized image 50 obtained by the dropout read of the filled-out business form 45 shown in FIG. 4. That is to say, a monochrome recognized image 50 from which fields 46 and characters indicative of items for the fields are deleted is obtained by reading the filled-out business form 45 with the color of a light source of the scanner 11 matched with, for example, "blue" being the dropout color of the business form. The classification ID does not use dropout color, so that it can be read on the recognized image 50 directly. The recognized image 50 obtained by the dropout read is an image in a black background. A position in coordinates of a field used for recognizing characters can be identified based upon the format definition information specified by the classification ID 44 by finding the edges of the business form in the black background.

Figure 7:
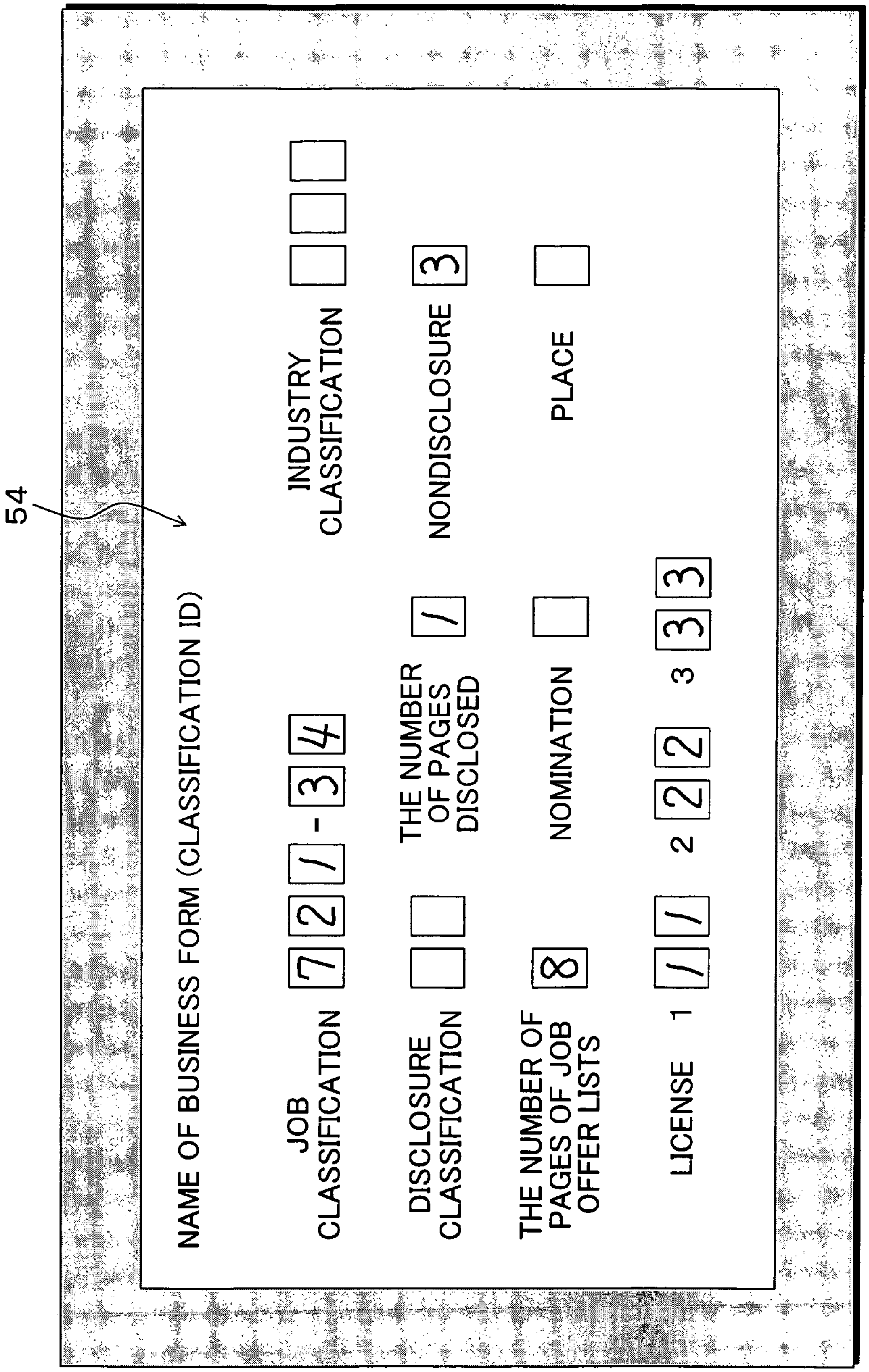
FIG. 7 is a drawing describing a composite image produced according to the present invention.

FIG. 7 is a drawing describing a composite image 54 produced according to the present invention. That is to say, both of the character box image 48 shown in FIG. 5 and the recognized image 50 shown in FIG. 6 are rotated and displaced in parallel to be free from displacement between them and to be exactly superposed on each other, which can restore an image of a handwritten business form as a composite image 54.

Figure 8A:
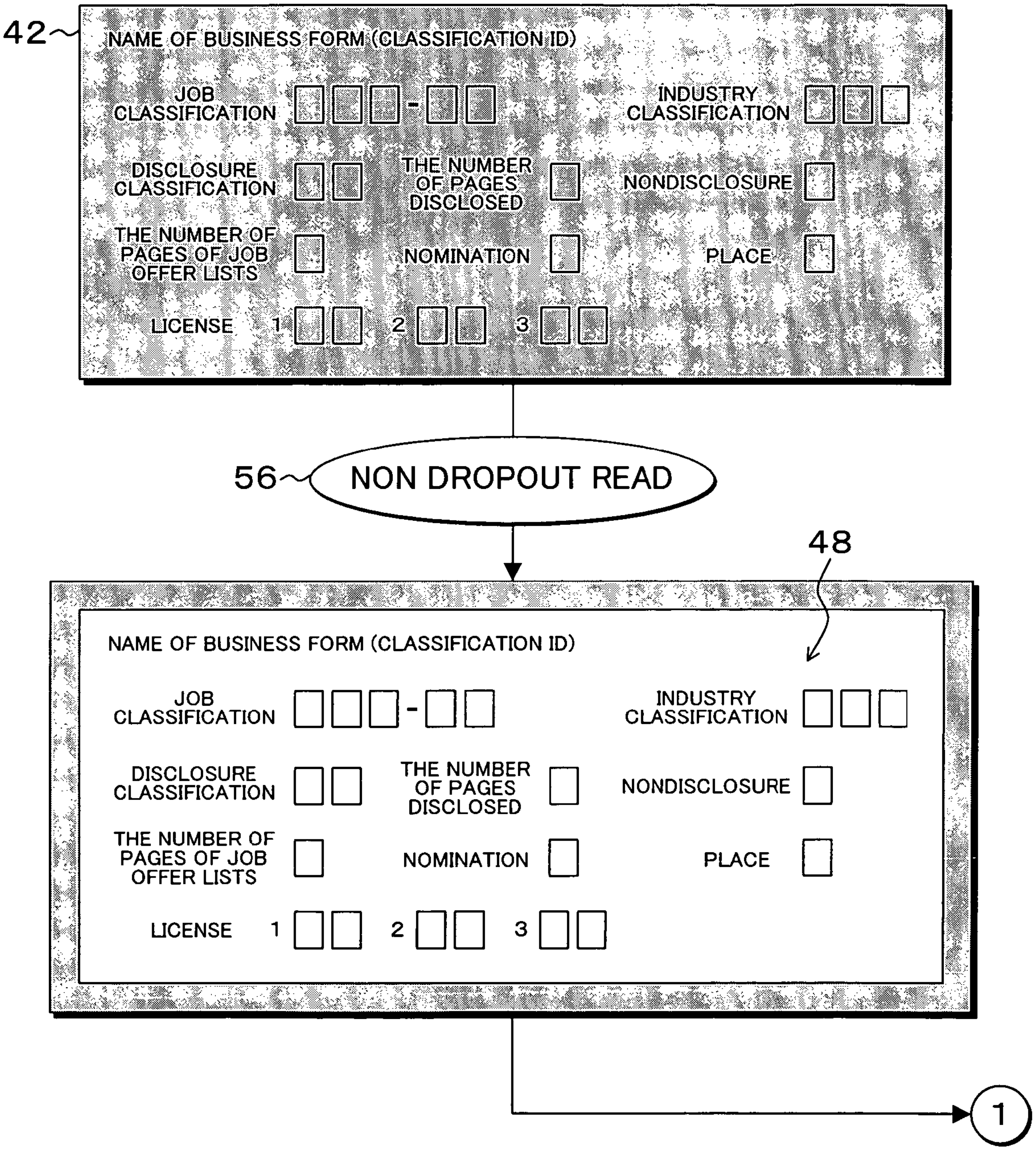

FIGS. 8A and 8B are drawing describing a process for composing the character box and read images according to the present invention with use of the images shown in FIG. 3 to FIG. 7. In FIGS. 8A and 8B the blank business form 42 is loaded in the scanner 11 without modification and read by a non-dropout read 56 to be a character box image 48 and stored with the classification ID for the image attached thereto. On the other hand, the filled-out business form 45 is loaded in the scanner 11 and read by a dropout read 58, by which fields and characters indicative of items for the fields are dropped out, thereby producing the recognized image 50 only with written characters and the classification ID. When there is a need for restoring the original filled out business form 45 to have been read in correcting recognized results, a composite image 54 is produced by composition 60 of the character box image 48 and the recognized image 50, arranged side by side with the recognized results, and displayed on the display unit 40.

FIG. 9 is a table describing a format definition file 22 shown in FIGS. 1A and 1B. The format definition file 22 stores format definition information with the classification IDs given to each of types of blank business forms. The format definition information shows which part of the business form is recognized as a character. Field coordinates are stored for each of field IDs, and field center coordinates are also stored to be used for detecting rotation angle and parallel displacement to correct an image displacement described later. For example, the character box image with the classification ID "001" has four fields of 001 to 004 in the filed ID. For the field ID of 001, for example, the field coordinates of "P11, P12, P13, and P14 and the field center coordinate of "P10" are stored.

FIG. 10 a table describing a character box-image file 24 shown in FIGS. 1A and 1B. The character box-image file 24 stores character box-image data read by the non-dropout color read from business forms with the classification IDs showing types of business forms, more specifically, the file stores pixel data composing images in accordance with the predetermined image code form. The character box image is colored in this example, so that each pixel data is for example RGB pixel data.

FIG. 11 is a table describing a recognized image file 26 shown in FIGS. 1A and 1B. The recognized image file 26 stores recognition image data read by the non-dropout read with the scanner 11 and, more specifically, the file stores pixel data composing images in accordance with the predetermined image code form with business form IDs and classification IDs attached thereto. The business form ID is an inherent identifier with which a filled-out business form is provided one by one. The business form ID may be printed in advance in non-dropout color on the business form as is the case with the classification ID, alternatively it may be provided in series to the business form ID as an identifier with the device when read. The recognized image data stored with which the business form IDs and the classification IDs provided is a monochrome image data, because the recognized image is monochrome.

Figure 12:
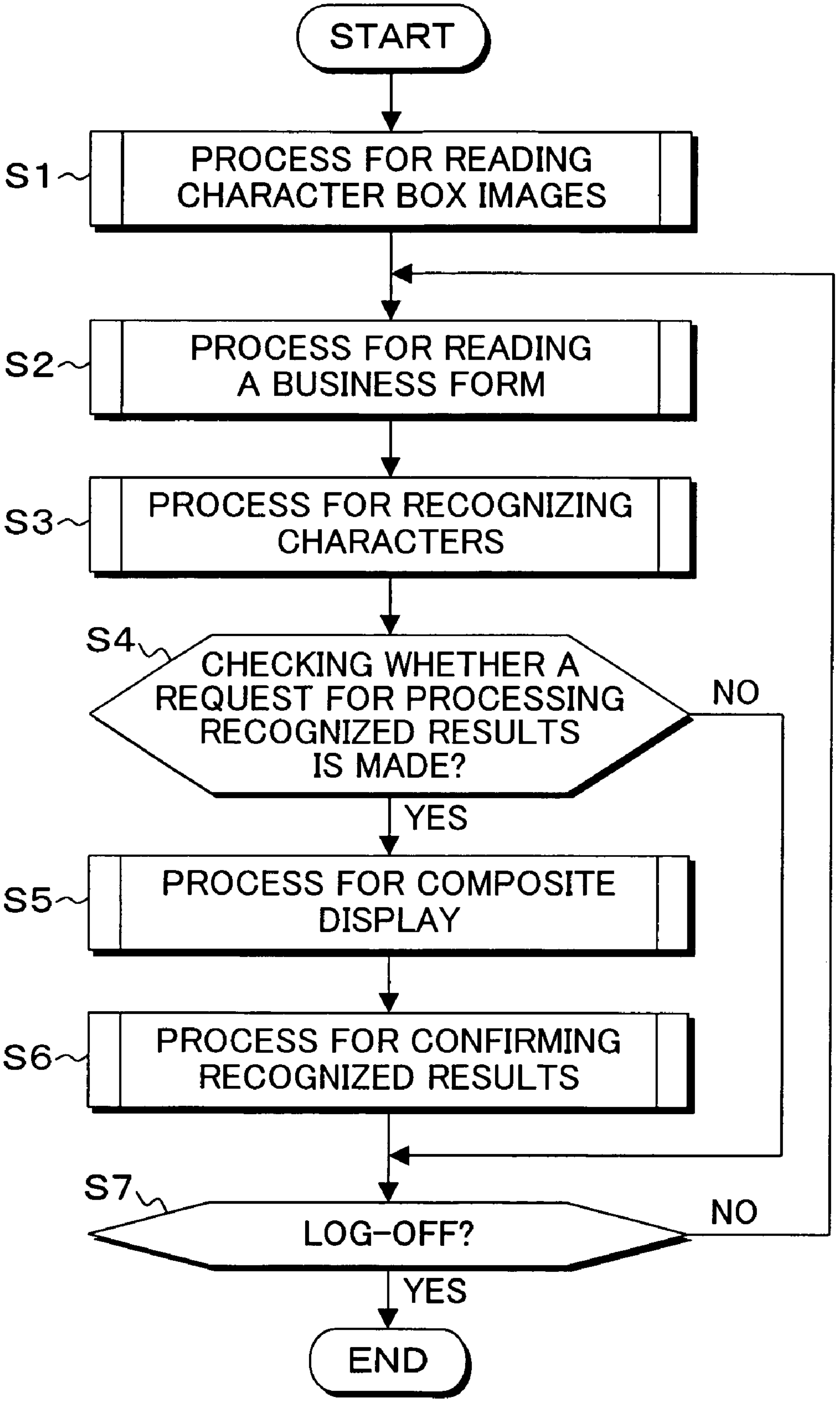
FIG. 12 is a flowchart for processing business forms according to the present invention.

FIG. 12 is a flowchart showing the process of business forms according to the present invention with the business form processing device 10 shown in FIGS. 1A and 1B. The processing steps in the flowchart represent the contents of the business form processing program according to the present invention. The steps for processing the business forms according to the present invention are described below.

Step S1: A process for reading character box images is executed in which plural types of blank business forms are read as character box image and provided with classification IDs respectively. At that point a format definition information is produced to specify an area to be read on character box images and stored at the same time.

Step S2: A filled-out business form is read while dropping out to obtain a monochrome recognized image only with the classification IDs and written characters. The recognized image is provided with the business form IDs and the classification IDs and stored.

Step S3: A character recognizing process is executed for the character reading field based on the format definition information obtained by the classification ID attached to the recognized-image to have been read at Step 2, and the read characters are arranged in a document with a predetermined format.

Step S4: A check is made to see whether there is a request for processing recognized results or not. If there is a request, the step proceeds to the step 5. If no, it proceeds to the step 7.

Step S5: A character box image of which process is requested is read by the classification ID of the business form and superposed on a recognized image to be currently processed, whereby executing a composite display process.

Step S6: The composite image obtained by the composite display process is displayed along with recognized results side by side to conduct a process for checking the recognized results.

Step S7: The step terminates the process when confirming log-off indicative of the termination of a series of processes through reading filled-out business forms. If process is not terminated, the processes are repeated from the step S2.

Figure 13:
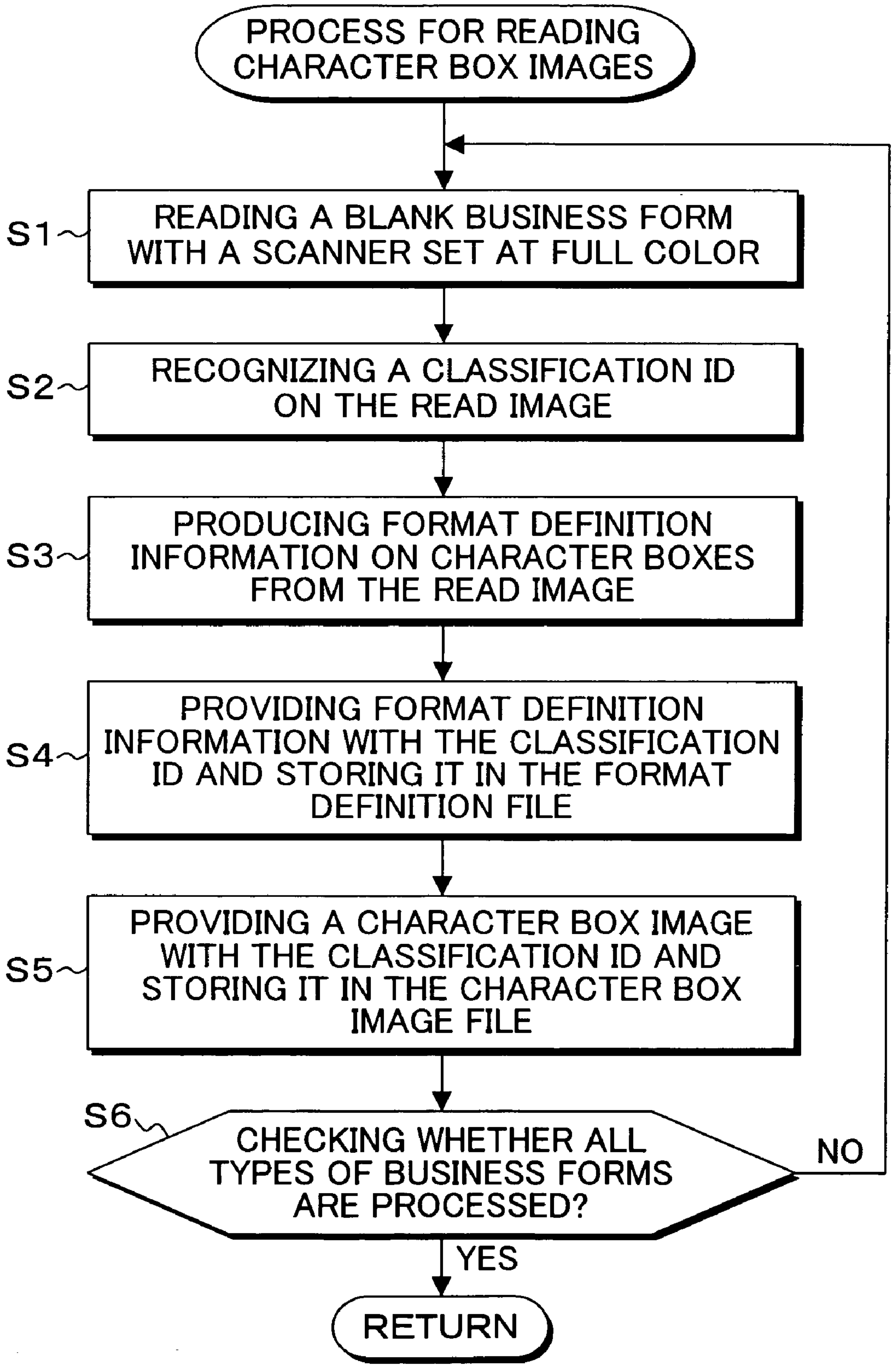
FIG. 13 is a flowchart showing the process for reading a character box image given in FIG. 12.

FIG. 13 is a flowchart showing a process for reading character box images shown in FIG. 12. The steps for the process of reading character box images are described below.

Step S1: A blank business form is read with the scanner 11 set at full color.

Step S2: A classification ID is recognized on the read image.

Step S3: Format definition information showing the positions of character boxes is prepared based on the read image.

Step S4: Format definition information is provided with a classification ID and then stored in the format definition file 22.

Step S5: Character box image is provided with a classification ID and then stored in the character box-image file 24.

Step S6: A check is made to ascertain whether the process of all types of business forms is finished. If it is not finished yet, the step is returned to the Step S1. If it is already finished, the step is terminated.

Figure 14:
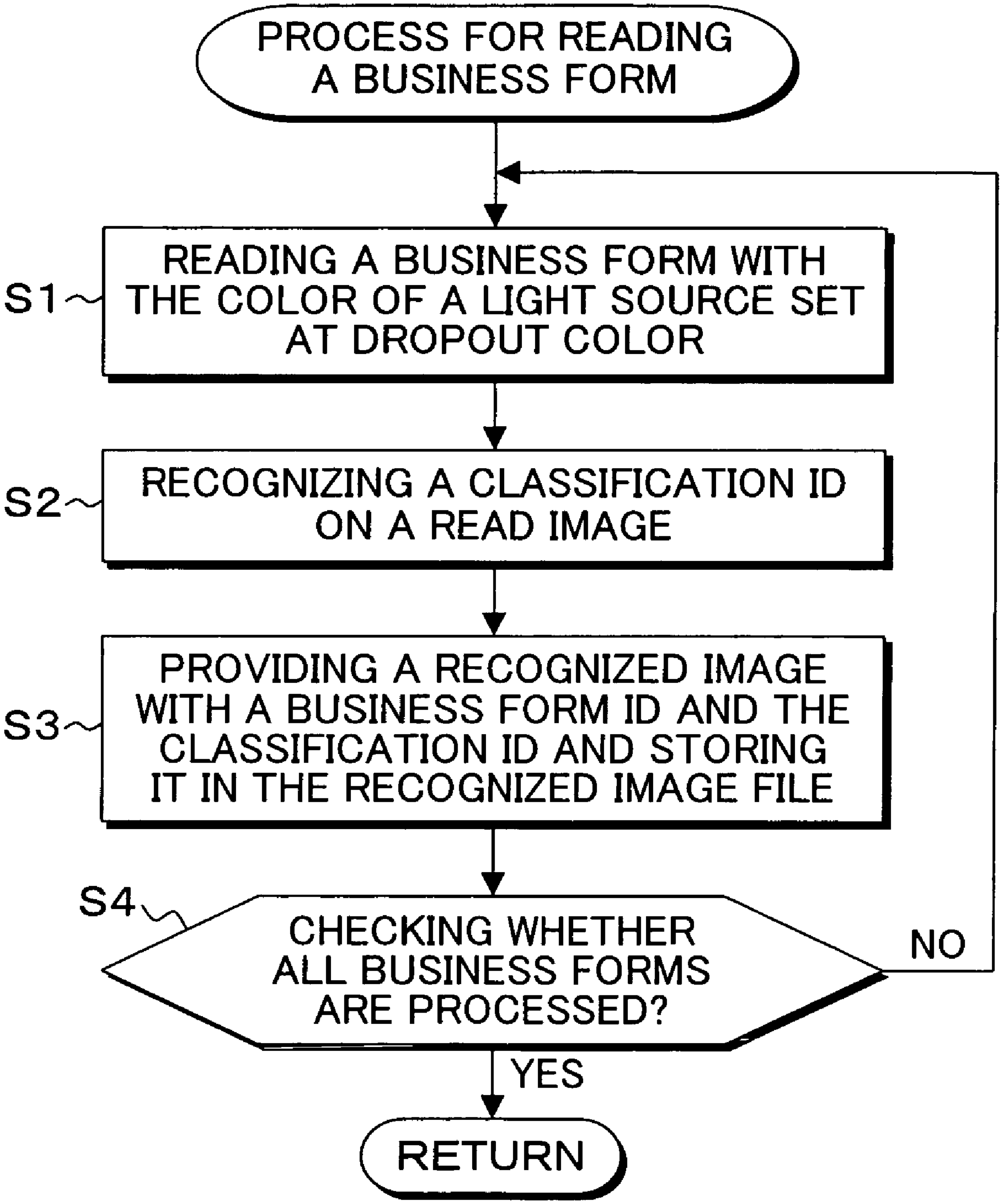
FIG. 14 is a flowchart showing the process for reading a business form given in FIG. 12.

FIG. 14 is a flowchart showing a process for reading business forms shown in FIG. 12. The steps are described below.

Step S1: A filled-out business form is read with a color of light source of the scanner 11 set at dropout color of the business form.

Step S2: A classification ID on the read image is recognized.

Step S3: A recognized image is provided with a classification ID and a business form ID and stored in the recognized image file 26.

Step S4: A check is made to see whether unprocessed business forms remain or not. If so, the step is returned to the step S1. If not, process is terminated.

Figure 15:
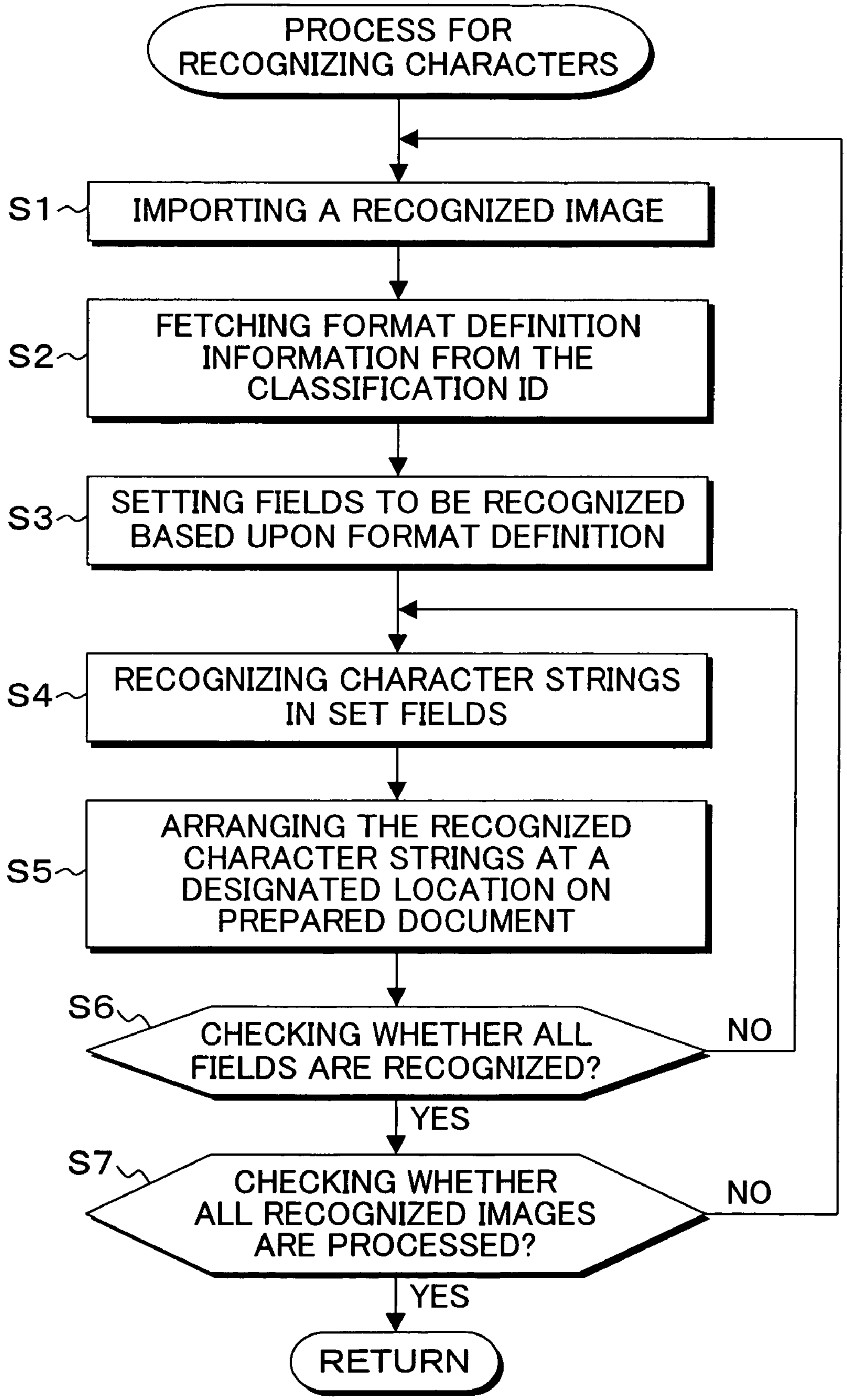
FIG. 15 is a flowchart showing the process for recognizing characters given in FIG. 12.

FIG. 15 is a flowchart showing a process for recognizing characters shown in FIG. 12. The steps for the process are described below.

Step S1: A recognized image read by the scanner 11 is imported as a target subjected to a process for recognizing characters.

Step S2: Format definition information is fetched by the classification ID with reference to the format definition file 22.

Step S3: Fields to be recognized are set at recognized image based upon format definition information.

Step S4: Character strings on the set fields are recognized.

Step S5: The recognized character strings are arranged at a designated location on a prepared document provided in advance.

Step S6: A check is conducted to see whether all fields of the business forms are recognized. If not, the step is returned to the Step S4. If so, it proceeds to the step S7.

Step S7: A check is made to see whether unprocessed recognized images remain or not. If so, the step is returned to the step S1. If not, the process is terminated.

Figure 16:
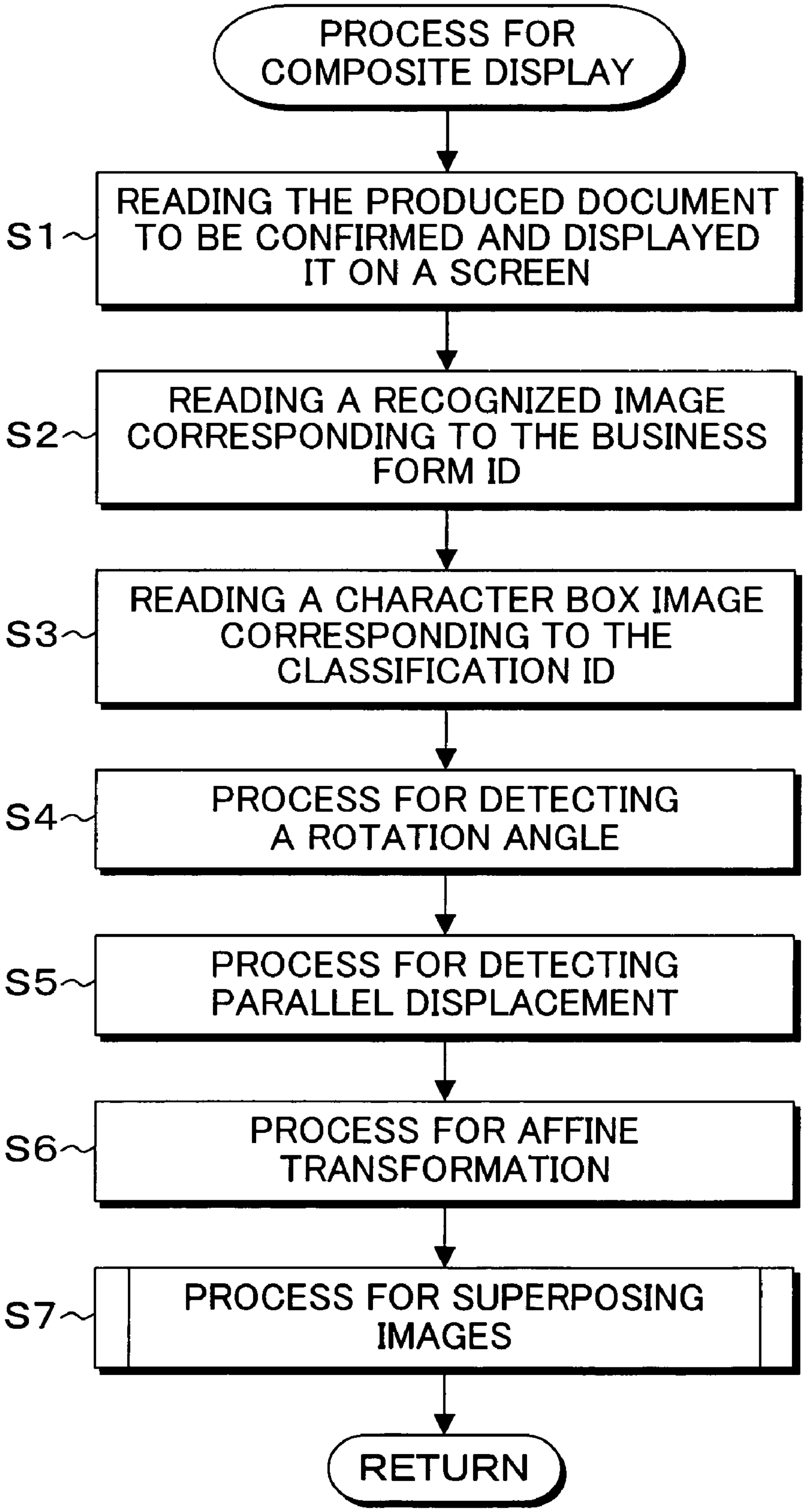
FIG. 16 is a flowchart showing the process for composing images given in FIG. 12.

FIG. 16 is a flowchart showing a process for composing images shown in FIG. 12. The steps for the process are described below.

Step S1: A prepared document to be checked is read and displayed on a screen.

Step S2: A recognized image corresponding to the business form ID is fetched from the recognized image file.

Step S3: A character box image corresponding to the classification ID is fetched from the character box-image file 24.

Step S4: A process for detecting a rotation angle is executed to detect the displacement in rotation angle between the character box and recognized images.

Step S5: A process for detecting a parallel displacement is executed to detect parallel displacements (x, y) in the X and Y axis directions of the character box and recognized images with the rotational displacement of a rotation angle θ to have been detected at the Step S4 corrected.

Step S6: The step executes the affine transformation process for determining corresponding relationships for each of pixels between the character box and recognized images on a basis of the detected rotation angle θ and parallel displacement (x, y).

Step S7: The step executes an image superposing process for superposing corresponding pixels between the character box and recognized images.

Figure 17B:
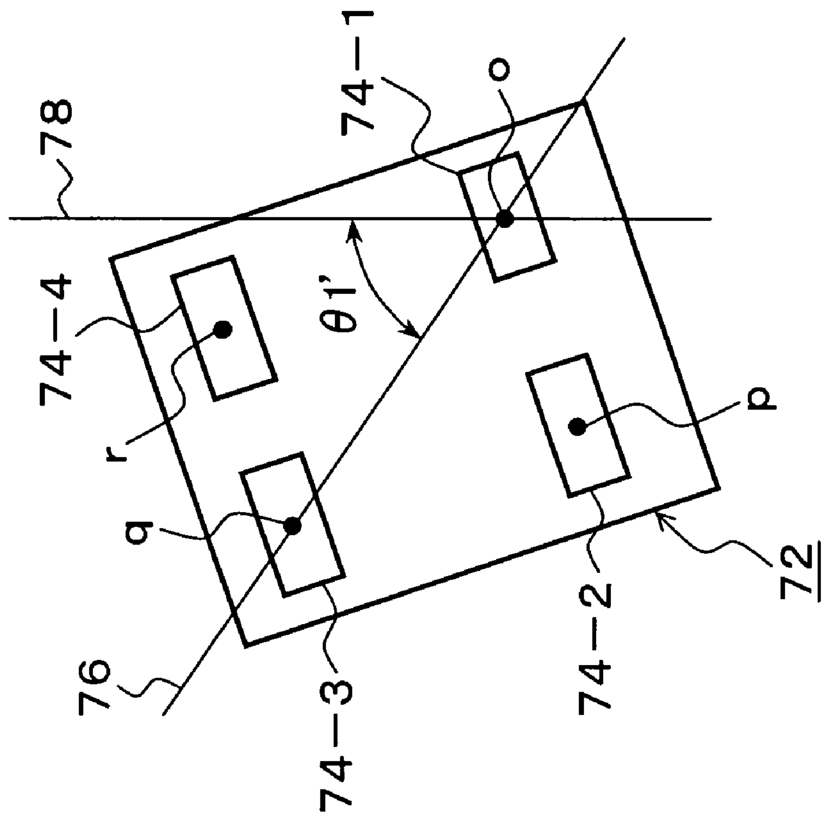
FIG. 17 is a drawing describing a process for detecting displacement in rotation angle between a character box image and a recognized image.

In the following are described in detail the rotation angle detecting process conducted at the Step S4 to correct the displacement of both images when the character box and recognized images are superposed on each other and the parallel displacement detecting process conducted at the Step S5. FIG. 17 is drawing describing a process for detecting displacement in rotation angle between the character box image and the recognized image.

Figure 17A:
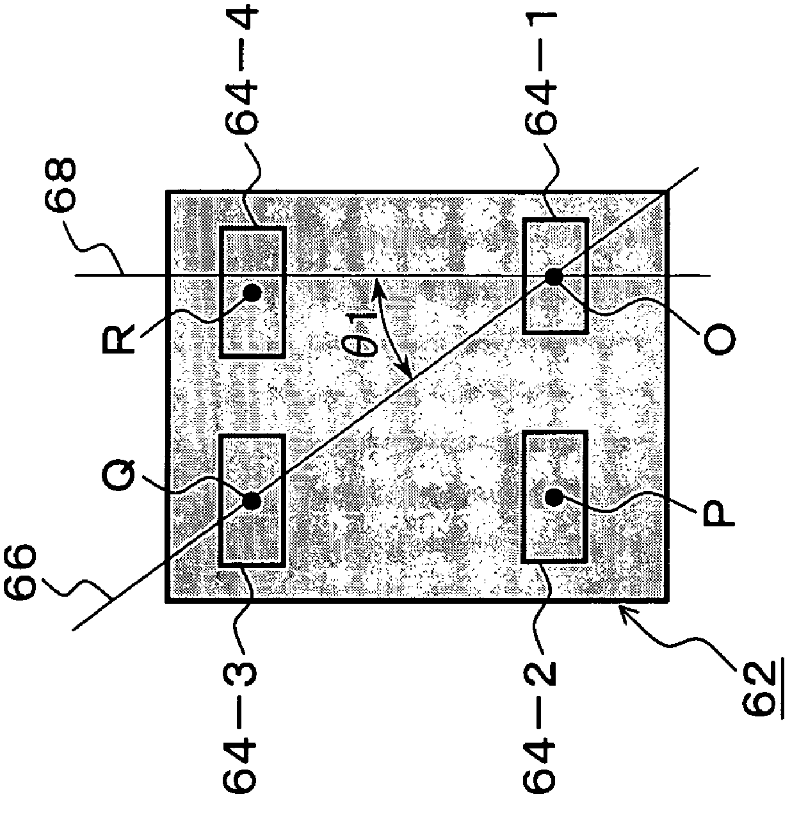

FIG. 17A shows a character box image 62. In this example are arranged four fields 64-1, 64-2, 64-3, and 64-4. The center points for the fields are given coordinates of center points O, P, Q, and R by the form definition information. For example, a reference angle θ1 in the character box image 62 is determined between a line 66 joining the center point O of the field 64-1 to the center point Q of the field 64-3 diagonal to the former and a perpendicular reference line 68 passing through the center point O of the field 64-1. Similarly, in the recognized image 72 shown in FIG. 17B, a reference angle θ1' is determined between a line 76 joining the center point o of the field 74-1 to the center point q of the field 74-3 diagonal to the former and a perpendicular reference line 78 passing through the center point o of the field 74-1. With consideration for deformation, stretch, and shrinkage of a business form to be read, a plurality of reference angles θm, and θm' for the character box image 62 and recognized image 72 are determined as reference angles θ1 and θ1' for the images 62 and 72. Then, the respective differences (θ'm−θm) are obtained as required values. The rotation angle θ can be expressed as follows:

$$Xm=(\theta'm-\theta m) \quad (1)$$

Rotation angle=median $(X_1, X_2, \ldots X_n)$ where, m: element number (1 to n)

n: the number of elements

θ: reference angle for character box image

θ': reference angle for recognized image.

Below is described a plurality of reference angles for the character box image 62 and recognized image 72. In the character box image 62 shown in FIG. 17A, for example, an angle formed by the line 66 connecting the field 64-1 to the field 64-3 and the perpendicular reference line 68 is determined as the reference angle θ1. In addition to that, an angle formed by a line connecting the center point O of the field 64-1 with the center point P of the field 64-2 and the perpendicular reference line 68 is determined as a reference angle θ2. Furthermore, an angle formed by a line connecting the center point O of the field 64-1 with the center point R of the field 64-4 and the perpendicular reference line 68 is determined as a reference angle θ3. Similarly, in the recognized image 72 shown in FIG. 17B, an angle formed by a line connecting the center point o of the field 74-1 with the center point q of the field 74-3 and a perpendicular reference line 78 is determined as a reference angle θ1'. Furthermore, an angle formed by a line connecting the center point o of the field 74-1 with the center point p of the field 74-2 and the perpendicular reference line 78 is determined as a reference angle θ2'. Still furthermore, an angle formed by a line connecting the center point o of the field 74-1 with the center point r of the field 74-4 and the perpendicular reference line 78 is determined as a reference angle θ3'. Then differences in reference angle between the character box image 62 and recognized image 72 are determined by the following three equations.

$$X1=(\theta 1'-\theta 1)$$

$$X2=(\theta 2'-\theta 2)$$

$$X3=(\theta 3'-\theta 3)$$

A median of the difference between three angles is taken to be a rotation angle θ. The number of reference angles to be determined for each of the images should be three or more.

Figure 18:
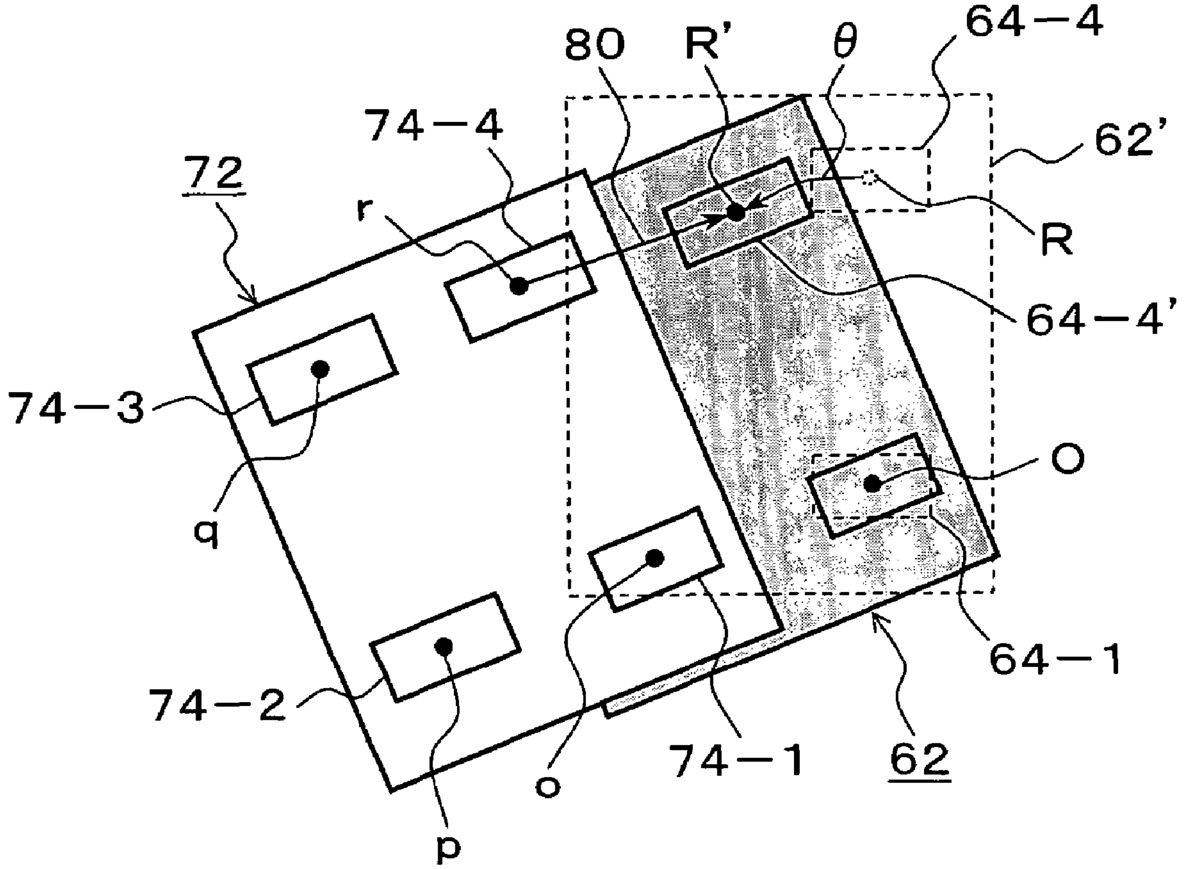
FIG. 18 is a drawing describing a process for detecting a parallel displacement between a character box image and a recognized image, the process being conducted after displacement in rotation angle is corrected.

FIG. 18 is drawing describing a process for detecting parallel displacement between a character box image and recognized image conducted after correcting the displacement in rotation angle θ detected in FIG. 17. In FIG. 18, for example, the rotation of the character box 62 around the center point O of the field 64-1 by the rotation angle θ determined by the process in FIG. 17 with the recognized image 72 fixed causes the field 64-4 to move to the field 64-4'. Then the displacement distance X=(x, y) in the X and Y axis directions is found as to a vector 80 joining a center r of the field 74-4 of the recognized image 72 with a center R' of the field 64-4' of the rotated character box image 62 opposing to the center r. As is the case with the reference angles, distances between plural fields on the recognized image 72 and the rotated character box image 62 are determined to take medians to be parallel displacements. Where, if a determined distance between plural fields on the recognized image 72 and the character box image 62 is taken to be bm (where, m is 1 to n), the parallel displacement Xm can be given by the following equation.

$$X_m=(b_{rm}-b'_m)$$

$$\text{Parallel displacement}=\text{median}(X_1, X_2, \ldots X_n) \quad (2)$$

$$(X', Y', 1)=\begin{pmatrix}\cos\theta & -\sin\theta & 0\\ \sin\theta & \cos\theta & 0\\ x & y & 1\end{pmatrix}\begin{pmatrix}X\\ Y\\ 1\end{pmatrix} \quad (3)$$

Where, m: element number (1 to n)

n: the number of elements $b_r$: coordinate obtained after character box image is rotated b': coordinate of recognized image Thus, the rotation angle θ and the parallel displacement X=(x, y) for correcting displacement between the character box image 62 and the recognized image 72 are detected, and then the affine transformation process at the Step S6 shown in FIG. 16 is conducted to determine pixels on the character box image 62 corresponding to arbitrary pixels on the recognized image 72. The following equation is given to express which pixel of the character box image 62 corresponds to that of the recognized image 72 with use of each affine transformation.

$$(x', Y', 1)=\begin{matrix}\text{Cos}\,\theta & -\sin\theta & 0 & X\\ \sin\theta & \cos\theta & 0 & Y\\ X & y & 1 & 1\end{matrix} \quad (3)$$

Where,

X, Y: coordinates of arbitrary pixels on character box image

X', Y': coordinates of pixels on recognized image

θ: rotation angle for superposition x, y: parallel displacement for superposition With the detection of the parallel displacement in FIG. 18, the character box image 62 is rotated by a rotation angle θ detected in FIG. 17, alternatively, contrary to the above, the recognized image 72 may be rotated by a detected rotation angle θ with the character box image 62 fixed to detect a parallel displacement.

Figure 19:
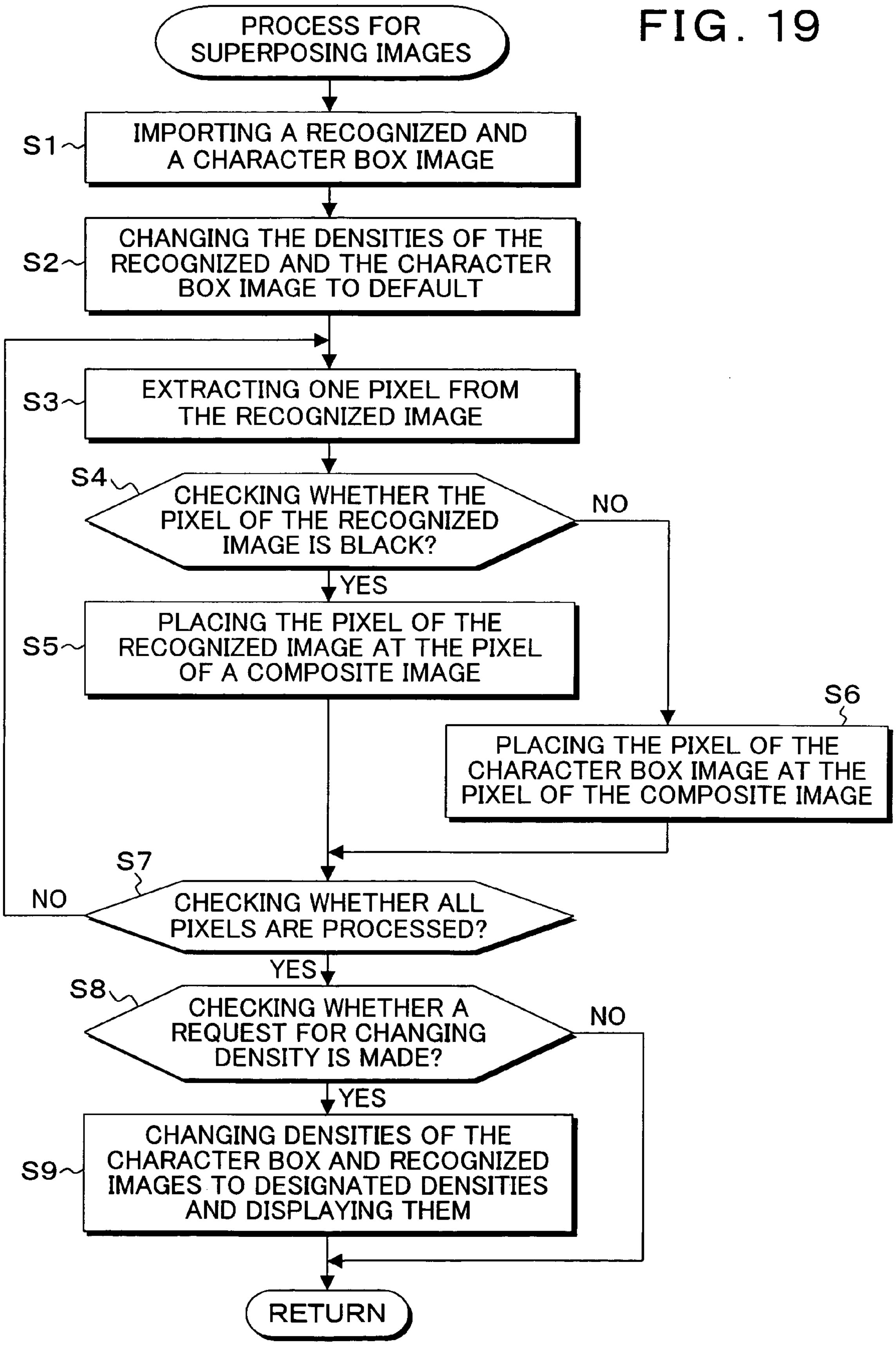
FIG. 19 is a flowchart showing a process for superposing images given in FIG. 16.

FIG. 19 is a flowchart describing in detail an image superposing process at the Step S7 shown in FIG. 16. The steps for the process are described below.

Step S1: The recognized and character box images whose pixels are in corresponding relationship with each other are imported by the affine transformation based upon the detected rotation angle θ and parallel displacement (x, y).

Step S2: The densities of the recognized and character box images are changed to predetermined default density.

Step S3: One pixel is extracted from the recognized image.

Step S4: A check is conducted to see whether the pixel of the recognized image is black or not. If it is black, the step proceeds to the Step S5. If not, it proceeds to the Step S6.

Step S5: When the pixel of the recognized image is black, it is placed at the pixel of the composite image.

Step S6: When the pixel of the recognized image is not black, the pixel of the character box image is placed at that of composite image.

Step S7: A check is made to see whether all pixels are processed or not. If not, the step is returned to the Step S3. If so, proceeding to the Step S8.

Step S8: A check is made whether there is a request for changing density. If so, the step proceeds to the Step S9. If no, the step terminates processing.

Step S9: Densities of the recognized and character box images are changed to designated densities and then displayed.

When colors of the character box and recognized images are superposed and outputted as one image in the image superposing process shown in FIG. 19, simply superposing the colors of both images at a ratio of 1:1 will thin down written characters, deteriorating visibility. For example, if the character box image is white, and the recognized image is black, superposing them at a ratio of 1:1 makes the composite color gray, decreasing visibility. Due to the above reason, as for the parts where characters are written, the present invention uses an original color of a character on the recognized image, on the other hand, as for the parts where characters are not written, it uses a color on the character box image. That can improve visibility at the parts where characters are written on the recognized image. In addition, more important parts on superposed images are written characters, so that parts for character boxes as a background need to be thinned down to emphasize the written characters. On the other hand, if background is vague, it is required to thin characters contrary in order to thicken the background.

As shown in the Step S2 of FIG. 19, basically the present invention conducts the superposition of images with densities of the recognized and character box images as a prescribed default density. It allows an operator to instruct the step to follow such a process that if written character are illegible, for example, a recognized image is thickened and at the same time a character box image is thinned, and if a background is vague to the contrary, characters are thinned and the background is thickened, while a screen is monitored after superposition. That is a process of changing density at the step S9 to meet a request for changing density at the Step S8 shown in FIG. 19. A color $C_{out}$ outputted as a composite image in superposing images shown in FIG. 19 can be defined by the following equation.

$$C_{out}=(1-a)C_{in}+a\beta C_{blended} \tag{4}$$

Where, $C_{in}$: luminance of RGB on a target image $C_{out}$: luminance of RGB outputted $C_{blended}$: maximum value of RGB luminance a: mixing ratio of $C_{in}$ to $C_{blended}$ β: adjustment ratio of RGB luminance That is to say, the change of the mixing ratio a and the adjustment ratio β as parameters in the equation (4) can change the densities of a character box and a recognized image. With regard to the recognized image on which characters are written, the density of the character box image as a background is changed if requested with the density of the recognized image fixed to that of a read image in the present invention. Fundamentally the following setting method is adopted.

(1) Default value of the density of the character box image is used without modification.

(2) After superposed images are displayed, the density value of the character box image is changed to display the images again.

(3) The density of the character box images to be superposed is automatically set so that the contrast between the character box and recognized images becomes equal to a predetermined value according to the density of the character box image.

Among various methods of setting the density of the character box image, the method of automatically setting the density of the character box image so that the contrast of the character box image to the recognized image can be equal to the predetermined value is by far more effective if the density of a business form is especially thick or thin and more convenient because a user does not need to instruct a density.

Figure 20A:
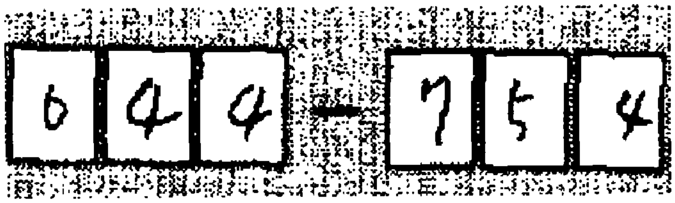
FIG. 20 is a drawing describing change in density of character box images.
Figure 20B:
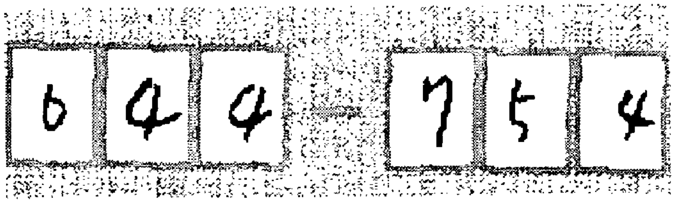

FIG. 20 is a drawing describing how the image is changed when the density of a character box image is changed in the image superposition process of FIG. 19. FIG. 20A shows an image produced by superposing read default values as is without changing density of the recognized image as a written character and the character box image as a background. FIG. 20B, on the other hand, shows a superposed image with the density of the character box image thinned. From the figure, it can be seen that the written characters on the recognized image have been more visible.

Figures 21A, 21B, 21C:
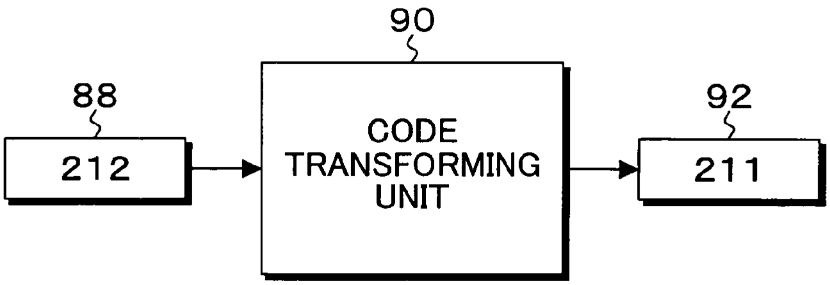
FIG. 21 is a drawing describing a process for allocating black to a palette color table.

FIG. 21 is a drawing describing a process for allocating black to a palette color table of the character box image in the image superposition process shown in FIG. 19. In the image superposing process shown in FIG. 19 a monochrome recognized image is superposed on a color character box image realized by a palette color table to produce a composite image. In that case, color of the composite image will depend on the palette color table of the character box image, but it is frequent that there is no black in the palette color table. It is therefore needed to allocate black to the palette color table of the character box image in order to represent black of the written characters as parts of the recognized image. Black is allocated to the palette color table with no black in the following manner. Firstly, combination of two colors which are most similar to each other is found in the table, for example, color data A of code number 211 and color data A' of code number 212 in the palette color table 84 in FIG. 21. Secondly, as shown in FIG. 21B, the color data of the code number 212 is replaced with black. The replacement of the color data A' of code number 212 with black cannot cause color to be represented by the correct color data A' of code number 212 in the character box image, so that the color data of the character box image undergoes code transformation as shown in FIG. 21C. A code transforming unit 90 transforms the code number "212" on the input code 88 in pixel data in the character box-image data to the code number "211" and outputs as the output code 92. In other words, since the code number 212 is replaced with black shown in FIG. 21B, the previous color data A' of the code number 212 is transformed to the color data A of the code number 211 most similar to the color data A' by the code transforming unit 90 and outputted. That can minimize change in color in the character box image because color lost by allocation is transformed to most similar color even if color is allocated to black, specific color of the palette color table of the character box image. In a composite image, white as well as black can be required. Similarly, it is also frequent that there is no white in the palette color table in the character box image. For that reason, as is the case with black, the second most similar color data B and B' are found except the color data A and A' to which black is allocated. White is allocated to the color data B'. The code number of the color data B' is transformed by the code transforming unit 90 to the color data B which is closer to white.

Figure 22:
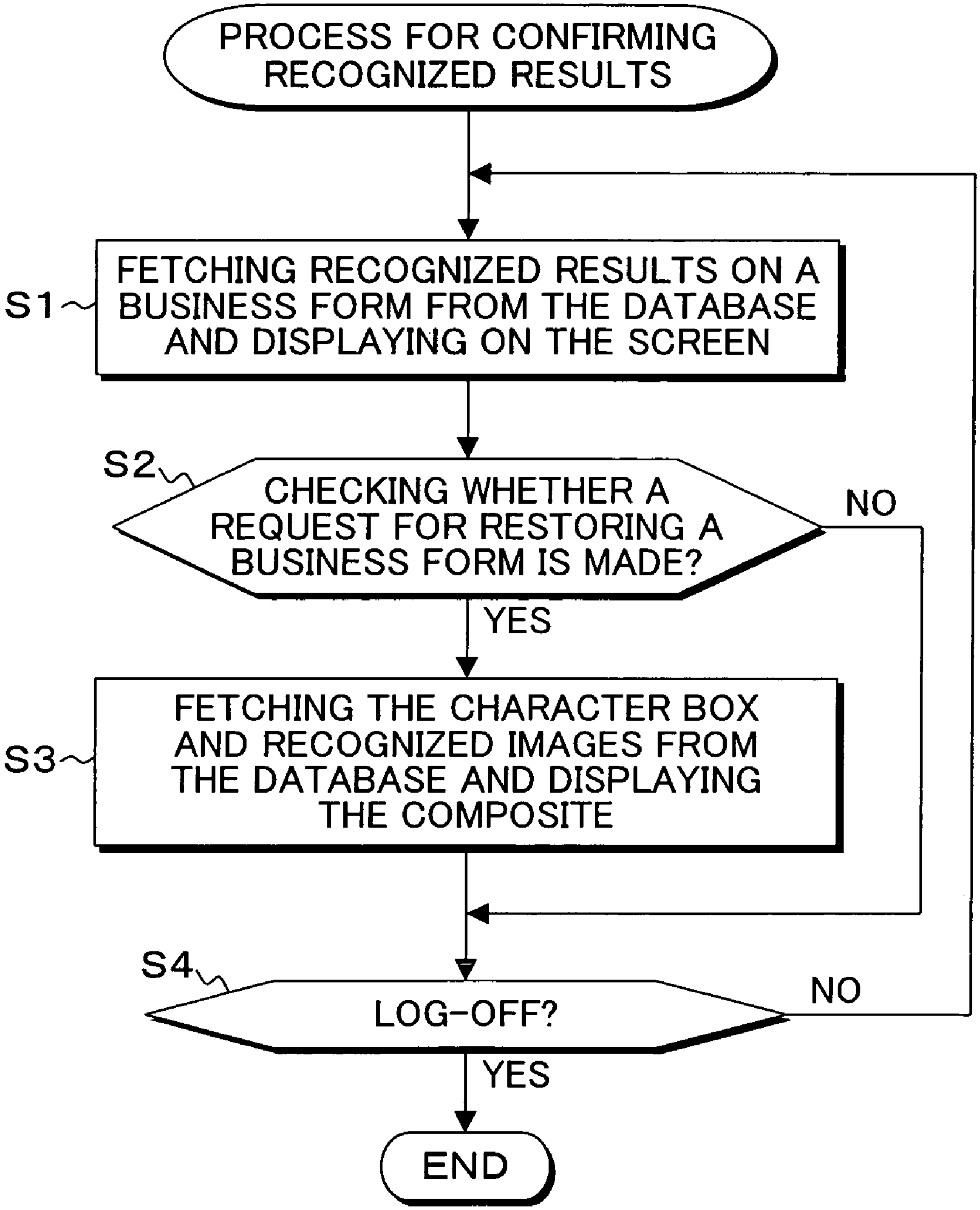
FIG. 22 is a flowchart showing a process for checking an image of the business form to be restored from the database.

FIG. 22 is a flowchart showing a process for checking an image of the business form to be restored from the database 15 in FIGS. 1A and 1B. That is to say, filled-out business forms are read with the scanner 11, the recognized results are checked on a display of the composite image consisting of a recognized and character box images. When required corrections are completed, documents prepared as recognized results are transferred to the server 12 and stored in the database 15. If anything improper in context is found in prepared documents as recognized results stored in the database 15 while the recognized results are being checked in a subsequent process, the image of an original business form is restored to check whether the recognized results are correct. Such process for checking recognized results shown in FIG. 22 is conducted as follows:

Step S1: Recognized results on a business form are fetched from the database 15 to be displayed on the screen.

Step S2: A check is made to see if there is a request for restoring a business form or not. If so, the step proceeds to the Step S3. If no, it proceeds to the Step S4.

Step S3: A character box and recognized images are obtained by a classification ID and a business form ID respectively from the database 15 based on the request for restoring business forms, and both images are composed and displayed in accordance with the steps for image superposition process shown in FIG. 19. In that case, however, the database, has stored a rotation angle θ and parallel displacement (x, y) to correct an image displacement, which needs detecting neither a rotation angle shown in FIG. 17, nor a parallel displacement shown in FIG. 18.

Step S4: If the step is instructed to log-off, it terminates processing. If not, it is returned to the Step S1.

A business form to be processed according to the present invention is not restricted in its size and format as long as it is a business form in which fields as a character entry frame are specified, so that it is properly applicable to business form processing. It is to be understood that suitable modifications may be made without departing from the purpose and advantage of the present invention and it is not restricted by the numerical values shown in the aforementioned embodiments.

INDUSTRIAL APPLICABILITY

According to the present invention described above, filled-out business form undergoes a dropout scanning to produce a recognized image, then an image of the filled out business form is restored by superposing a character box image thereon obtained in advance by non-dropout read and stored, the restored image is arranged side by side with the recognized result and displayed on the screen, which allows an operator to clearly recognize a corresponding relation in which the recognized results are written in which fields of the read business form and to check and correct the results of read business forms simply and surely.

With the character box image to be dropped out in reading filled-out business form, it is only necessary to store a character box image of types of business forms to be read, which can substantially reduce storage capacity for image data to be required in restoring read filled-out business form in comparison with the case where non-dropout business form read images are all stored. In other words, in the present invention the character box image requiring to be stored in the form of color image data needs only storage used for types of business forms, consequently it is only necessary to store a very smaller amount of color image data, for example, several tens of types, as compared with image data of filled-out business forms to be read on a day-to-day basis.

A recognized image where dropout image is obtained used for restoring filled-out business form by superposing the character box image thereon needs only a monochrome image, so that storage capacity for image data of recognized image to be stored can be sharply saved in comparison with the storage of color image data even if the number of business forms are increased.

For a scanner to be used in the present invention, a special one is not needed that can provide simultaneously non-dropout and dropout read images while reading business forms. A universal color scanner in which colors to be read can be set is available. It is easy to introduce the scanner, whereby reducing the cost. It is required to store character box images by reading types of business forms prior to the superposition of characters, but reading only once the filled-out business form can restore filled-out business forms by the superposition with the stored character box image, improving working efficiency in reading work.

Furthermore, even if there is displacement between the character box image read and stored according to types of business forms respectively and recognized image of filled-out business forms read actually at the read processing, a rotation angle and parallel displacement corresponding to displacement of the two images are determined to correctly detect displacement in position, thereby superposing images correctly positioned. Even a dropped out and recognized image can be restored precisely to a business form image equivalent to a filled-out business form actually loaded in the scanner.

The invention claimed is:

1. A computer-readable storage medium which stores a business form processing program causing a computer to execute operations, comprising:

reading all colors of a business form with blank character boxes and storing said all colors as character box images wherein said reading of all colors of the business form includes reading a character-box image as an image with a black background, determining an end of the business form from said black background, and storing format definition information comprising character box coordinates and character box center coordinates which represent a character recognition object area, by attaching a type ID written on said business form together with said read character box image;

setting a color of a light source as a color of unwanted recognized part on the business form, reading a recognized image from which colors of unwanted recognized parts on a filled-out business form are dropped out and storing said recognized image;

recognizing characters on said recognized image based on a format definition file of said business form indicating characters in relation to said recognized image prior to said recognizing said character recognizing executes character recognition within each character box based on the format definition information stored; and displaying a composite display of character recognized results and a filled-out business form image in which said recognized image is superposed on the character box image, and said displaying executes a composite display processing of synthesizing the characters recognized with the character boxes corresponding to said format information and superposing the characters and boxes.

2. The storage medium according to claim 1, wherein said displaying of the composite display comprises:

detecting a rotation angle to be used for superposing the recognized image on the character box image;

detecting a parallel displacement to be used for superposing both images on each other with either the recognized image or the character box image rotated by said rotation angle; and composing pixel values based on corresponding relations between pixels of said recognized and character box images obtained with respect to said rotation angle and parallel displacement, wherein said detecting of the rotation angle and said detecting of the parallel displacement detect a rotation angle and parallel displacement using the positional relationship between center coordinates in corresponding plural fields on the character box image and the recognized image.

3. The storage medium according to claim 2, wherein said detecting of the rotation angle and detecting of the parallel displacement determine a median out of plural rotation angles and parallel displacements detected using the positional relationship between center coordinates in corresponding plural fields on the character box image and the recognized image.

4. The storage medium according to claim 1 wherein, said reading of character boxes includes reading and storing the character box image from various plural business forms, and providing said character box image with a classification identifier recognized from the read image, reading said business form includes reading and storing the recognized image from which colors of unwanted recognized parts on the filled-out business form are dropped out, and providing the read image with the classification identifier recognized from said read image, and said displaying of the composite display selects the character box image with an identifier corresponding to the identifier of said recognized image and superposes it thereon.

5. The storage medium according to claim 1, wherein said displaying of the composite display displays the filled-out business form image in which said recognized image to be stored is superposed on the character box image when needed after the recognized result is stored.

6. The storage medium according to claim 1, wherein said displaying of the composite display conducts a composite display with densities of the recognized and the character box image fixed at a predetermined density.

7. The storage medium according to claim 1, wherein said displaying of the composite display conducts a composite display with densities of the recognized and the character box image changed.

8. The storage medium according to claim 1, wherein said displaying of the composite display conducts a composite display with densities changed so that the ratio in density between the recognized and character box images is equal to a predetermined value.

9. The storage medium according to claim 1, wherein said displaying of the composite display includes selecting a pixel value of the recognized image when a pixel of the recognized image is superposed on that of the character box image.

10. A method for processing business forms, the method comprising:

reading all colors on the business forms with blank character boxes and storing said all colors as a character box image wherein said reading of all colors of the business form includes reading a character-box image as an image with a black background, determining an end of the business form from said black background, and storing format definition information comprising character box coordinates and character box center coordinates which represent a character recognition object area, by attaching a type ID written on said business form together with said read character box image;

setting a color of a light source as a color of unwanted recognized part on the business form, reading a recognized image from which colors of unwanted recognized parts on a filled-out business form are dropped out and storing said recognized image;

recognizing characters on said recognized image based on a format definition file of said business form indicating characters in relation to said recognized image prior to said recognizing said character recognizing executes character recognition within each character box based on the format definition information stored;

displaying a composite display having character recognized results and a filled-out business form image produced by superposing said recognized image on the character box image, and said displaying executes a composite display processing of synthesizing the characters recognized with the character boxes corresponding to said format information and superposing the characters and boxes.

11. A business form processing device comprising:

a character box-image reading unit for reading all colors of a business form with blank character boxes and storing said all colors as a character box image wherein said character box image reading unit reads out a character-box image as an image with a black background, determines an end of the business form from said black background, and stores format definition information comprising character box coordinates and character box center coordinates which represent a character recognition object area, by attaching a type ID written on said business form together with said read character box image;

a business form reading unit for setting a color of a light source as a color of unwanted recognized part on the business form, reading a recognized image from which colors of unwanted recognized parts on a filled-out business form are dropped out and storing said recognized image;

a character recognizing unit for recognizing characters on said recognized image based on a format definition file of said business form indicating characters in relation to said recognized image prior to said recognizing said character recognizing unit executes character recognition within each character box based on the format definition information stored by said character reading unit; and a composite displaying unit for displaying character recognized results and a filled-out business form image produced by superposing said recognized image on the character box image, said composite displaying unit executes a composite display processing of synthesizing the characters recognized by said character recognizing unit with the character boxes corresponding to said format information and superposing these characters and boxes.

* * * * *

UNITED STATES PATENT AND TRADEMARK OFFICE

CERTIFICATE OF CORRECTION

PATENT NO. : 7,551,778 B2
APPLICATION NO. : 11/255935
DATED : June 23, 2009
INVENTOR(S) : Jun Miyatake et al.

It is certified that error appears in the above-identified patent and that said Letters Patent is hereby corrected as shown below:

On the Title Pg, Item (56) (U.S. Patent Documents), Line 1, change "715/506" to --715/200--.

On the Title Pg, Item (57) (Abstract), Line 12, change "correted." to --correction.--.

Column 16, Line 6, change "images" to --images;--.

Column 16, Line 24, change "recognizing" to --recognizing;--.

Column 16, Line 27, change "information stored; and" to --information stored;--.

Column 17, Line 34, change "image" to --image;--.

Column 17, Lines 34-42, change
"image wherein said reading of all colors of the business
form includes reading a character-box image as an
image with a black background, determining an end of
the business form from said black background, and
storing format definition information comprising character
box coordinates and character box center coordinates
which represents a character recognition object area, by
attaching a type ID written on said business form
together with said read character box image;" to
--image;
wherein said reading of all colors of the business
form includes reading a character-box image as an
image with a black background, determining an end of
the business form from said black background, and
storing format definition information comprising character
box coordinates and character box center coordinates
which represent a character recognition object area, by
attaching a type ID written on said business form
together with said read character box image;--.

Column 18, Lines 2-4, change
"said recognizing said character recognizing executes
character recognition within each character box based
on the format definition information stored:" to
--said recognizing;
said character recognizing executes
character recognition within each character box based
on the format definition information stored;--.

Column 18, Lines 16-20, change
“said all colors as a character box image wherein said
character box image reading unit reads out a character-box
image as an image with a black background, determines
an end of the business form from said black background,
and stores format definition information” to
--said all colors as a character box image;
wherein said character box image reading unit reads out a character-box
image as an image with a black background, determines
an end of the business form from said black background,
and stores format definition information--.

Column 18, Lines 35-39, change
“said recognized image prior to said recognizing said
character recognizing unit executes character recognition
within each character box based on the format definition
information stored by said character reading unit;
and” to
--said recognized image prior to said recognizing;
said character recognizing unit executes character recognition
within each character box based on the format definition
information stored by said character reading unit;
and--.

Column 18, Line 43, change “character box image,” to --character box image, and--.

Signed and Sealed this

Sixth Day of April, 2010

David J. Kappos
*Director of the United States Patent and Trademark Office*